(12) United States Patent
Kunitani et al.

(10) Patent No.: US 7,684,649 B2
(45) Date of Patent: Mar. 23, 2010

(54) BRIGHTNESS SIGNAL PROCESSING APPARATUS

(75) Inventors: Hisao Kunitani, Kyoto (JP); Satoru Tanigawa, Hyogo (JP); Takashi Koizumi, Shiga (JP)

(73) Assignee: Panasonic Corporation, Osaka (JP)

( * ) Notice: Subject to any disclaimer, the term of this patent is extended or adjusted under 35 U.S.C. 154(b) by 821 days.

(21) Appl. No.: 11/587,204

(22) PCT Filed: Apr. 20, 2005

(86) PCT No.: PCT/JP2005/007514

§ 371 (c)(1),
(2), (4) Date: Oct. 23, 2006

(87) PCT Pub. No.: WO2005/104530

PCT Pub. Date: Nov. 3, 2005

(65) Prior Publication Data

US 2007/0216815 A1    Sep. 20, 2007

(30) Foreign Application Priority Data

Apr. 23, 2004   (JP)   ............................ 2004-127701

(51) Int. Cl.
*G06K 9/32*   (2006.01)
(52) U.S. Cl. ..................... 382/299; 382/274; 348/668; 348/687; 348/399.1; 348/501; 345/589; 345/617
(58) Field of Classification Search .................. 382/299, 382/274; 348/668, 687, 399.1, 501
See application file for complete search history.

(56) References Cited

U.S. PATENT DOCUMENTS

| | | | |
|---|---|---|---|
| 6,295,095 B1 * | 9/2001 | Kawabata et al. | 348/576 |
| 6,967,692 B1 * | 11/2005 | Kakuya et al. | 348/712 |
| 6,980,258 B1 * | 12/2005 | Matsunaga | 348/625 |
| 2006/0119564 A1 * | 6/2006 | Fry | 345/102 |
| 2006/0158394 A1 * | 7/2006 | Choi | 345/76 |

FOREIGN PATENT DOCUMENTS

| | | |
|---|---|---|
| JP | 2002-521922 A | 7/2002 |
| WO | WO 01/39489 A1 | 5/2001 |

* cited by examiner

*Primary Examiner*—Anand Bhatnagar
*Assistant Examiner*—Mark Roz
(74) *Attorney, Agent, or Firm*—McDermott Will & Emery LLP

(57) ABSTRACT

To improve accuracy of determining the average brightness level and maximum and minimum levels of the brightness signals for the entire screen.

There are included a differential operation circuit that detects and differentiates rise or breaking edges in horizontal and vertical synchronous signals of an input image signal, thereby outputting horizontal and vertical differential signals synchronized with the horizontal and vertical synchronous signals, respectively; a sample window circuit that detects the beginning and ending positions of horizontal and vertical intervals to produce sample window signals established in any desired vertical and horizontal positions on the screen in accordance with the horizontal and vertical differential signals; and a brightness signal output circuit that outputs sampled brightness signals when the sample window circuit is operative.

10 Claims, 30 Drawing Sheets

S16 bit shift signal
S17 coincidence detecting signal
S18 coincidence detecting signal
S19 horizontal sampling effective period signal
S21 delayed horizontal pixel skipping sampling signal
S22 sampling pixel position switching signal

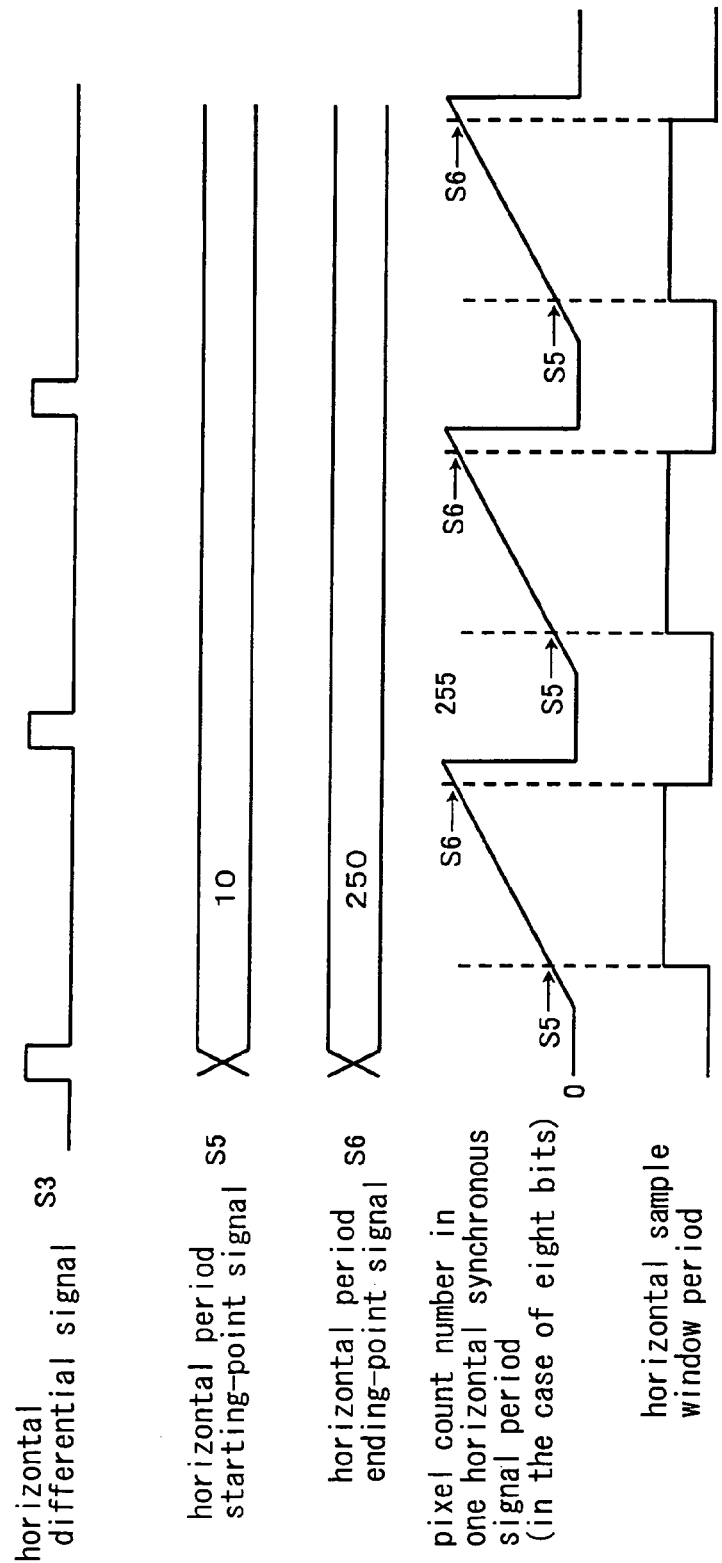

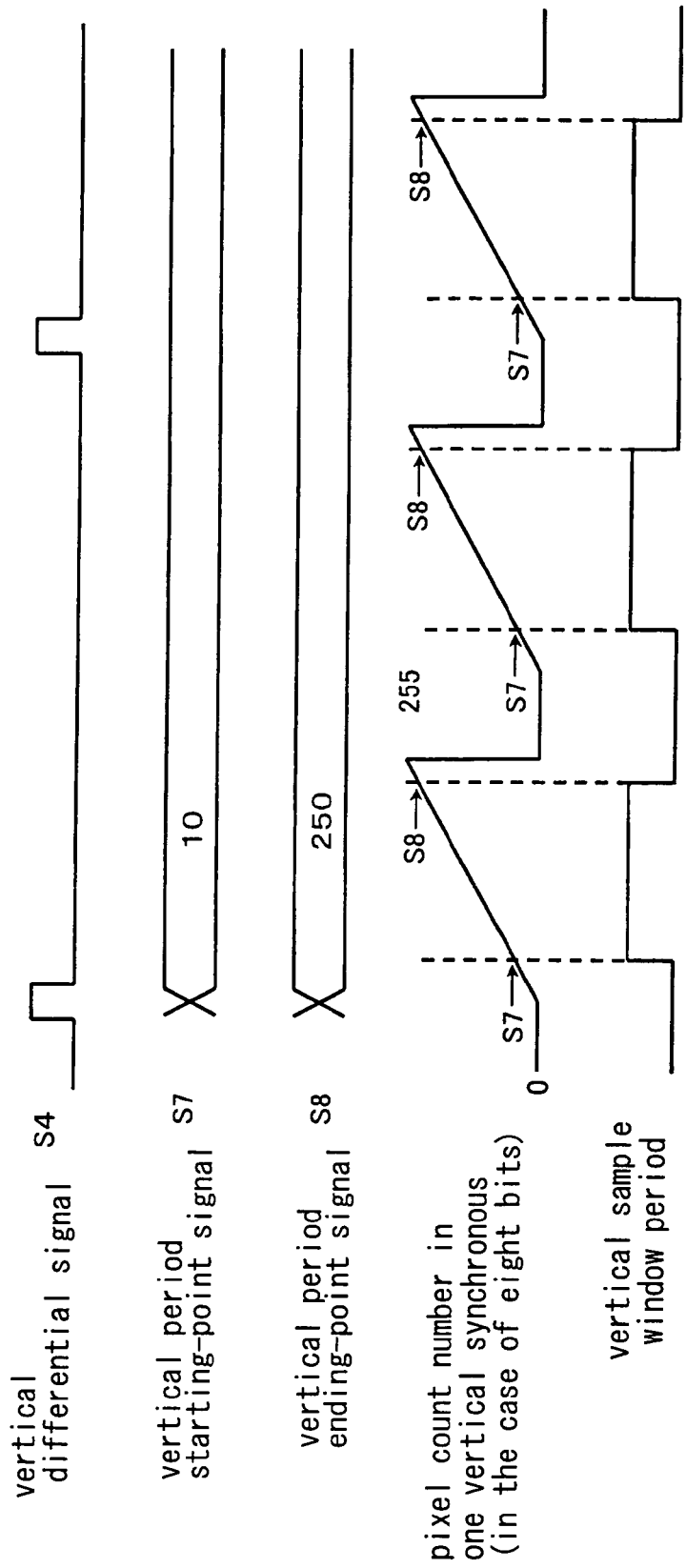

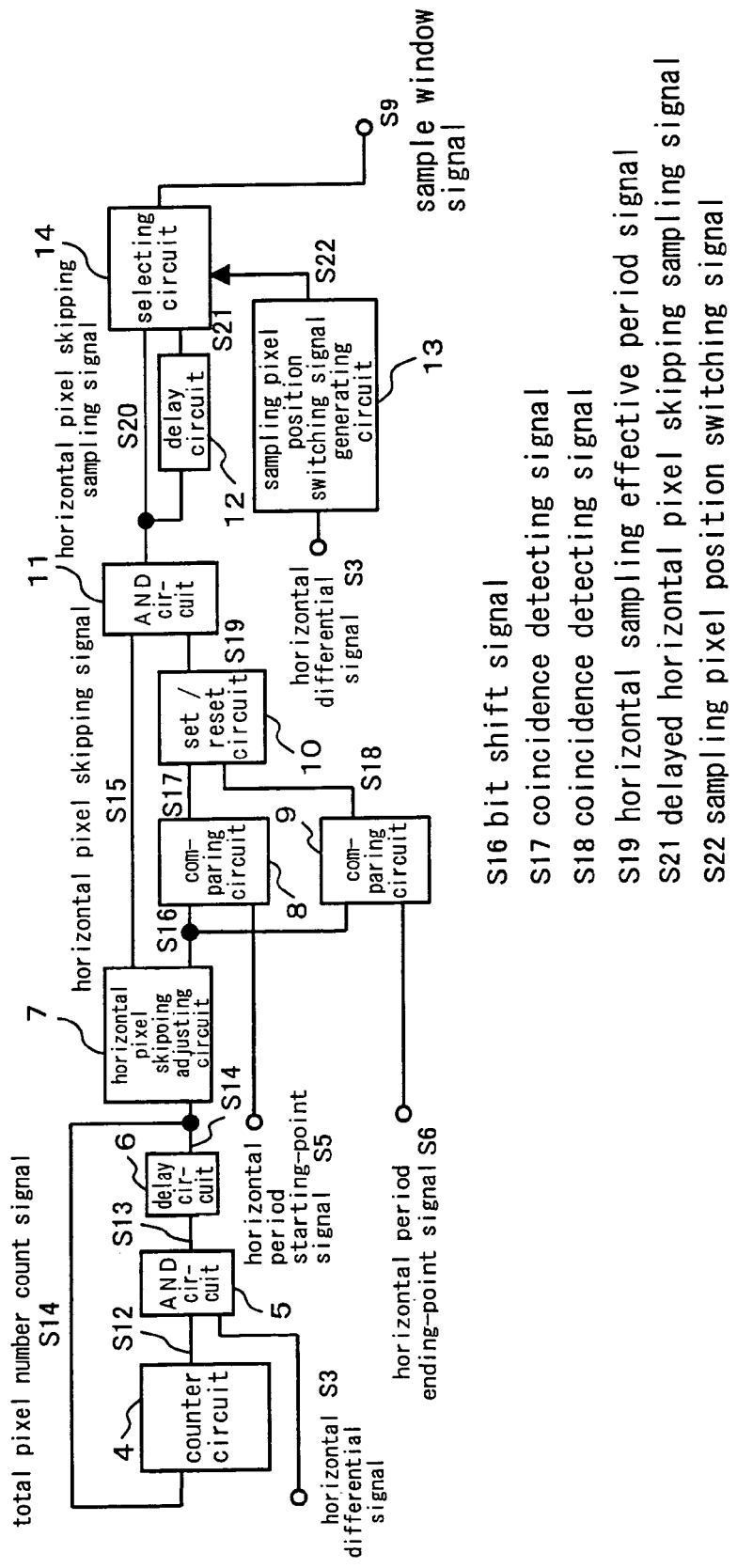

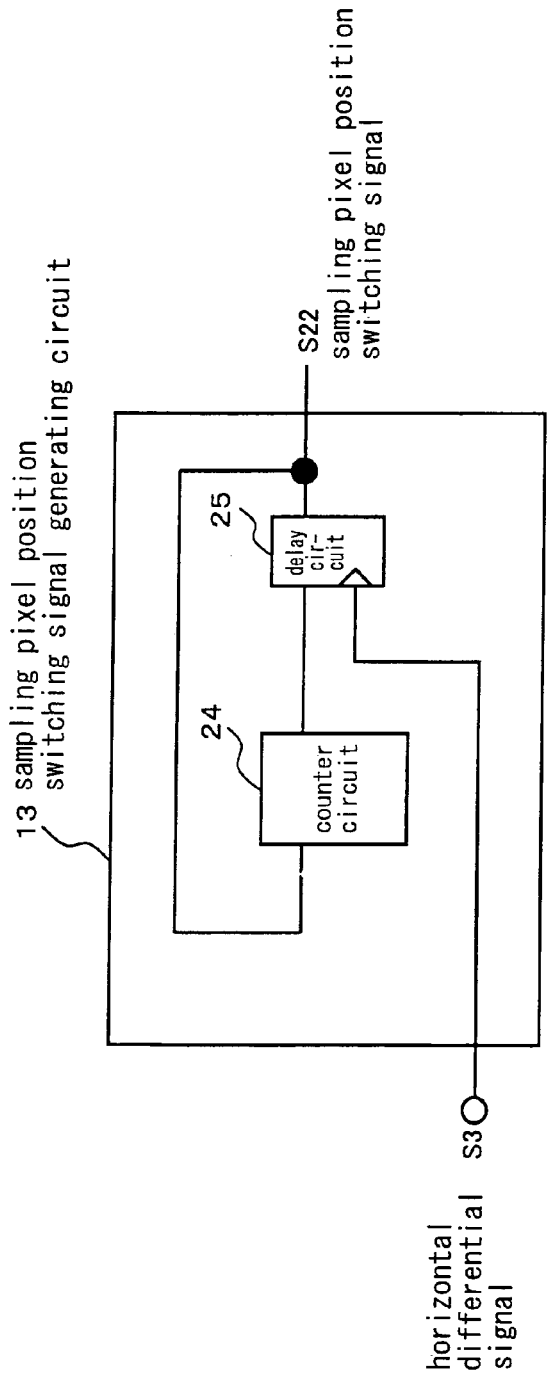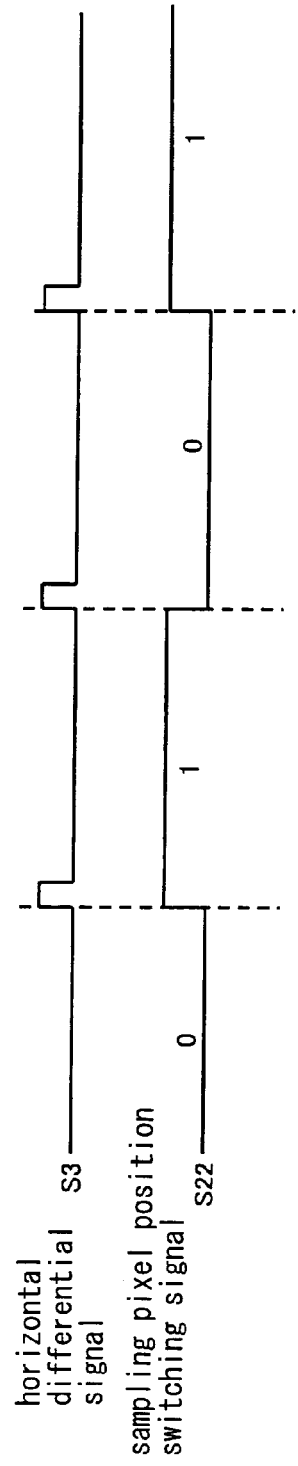

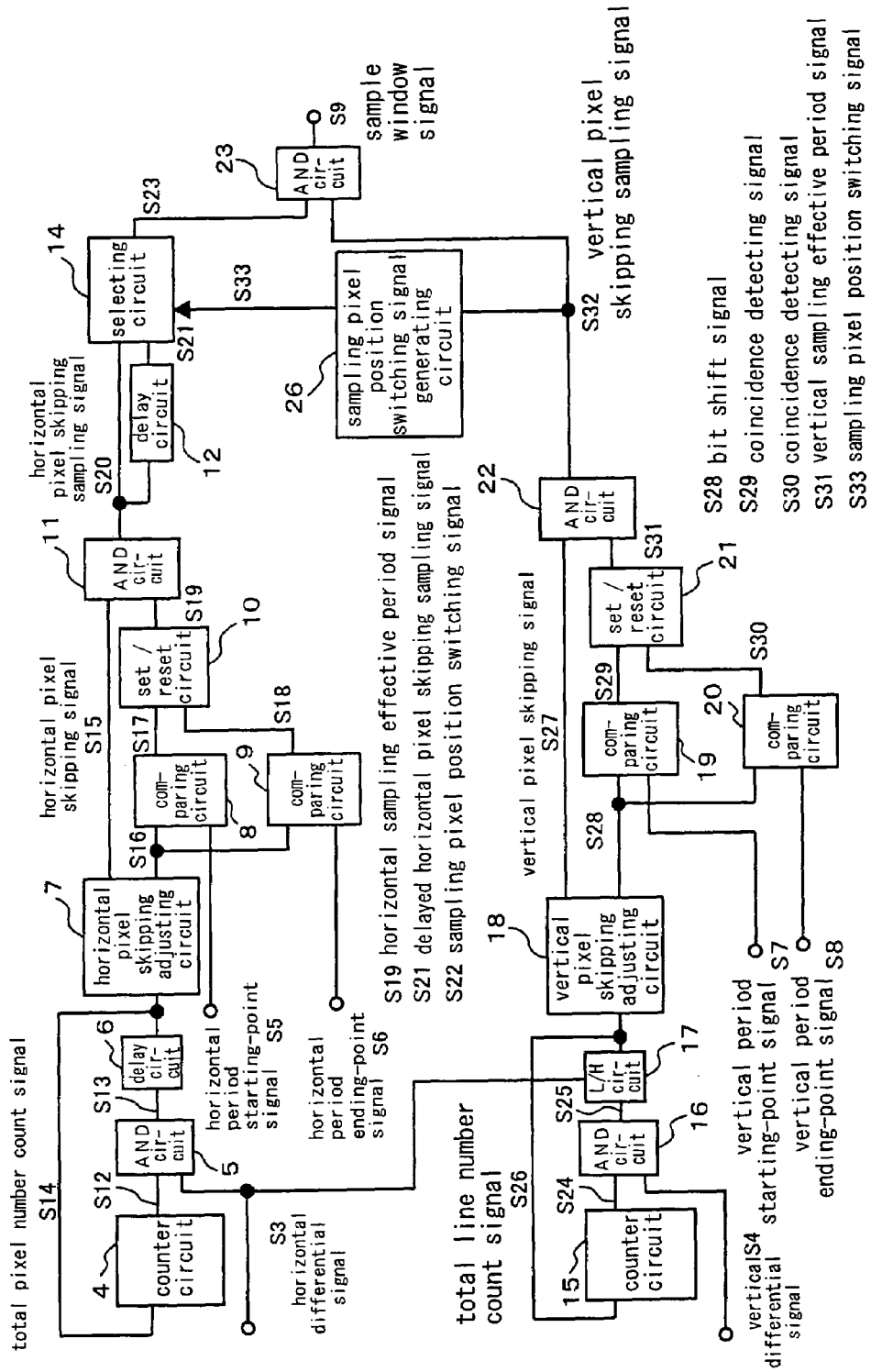

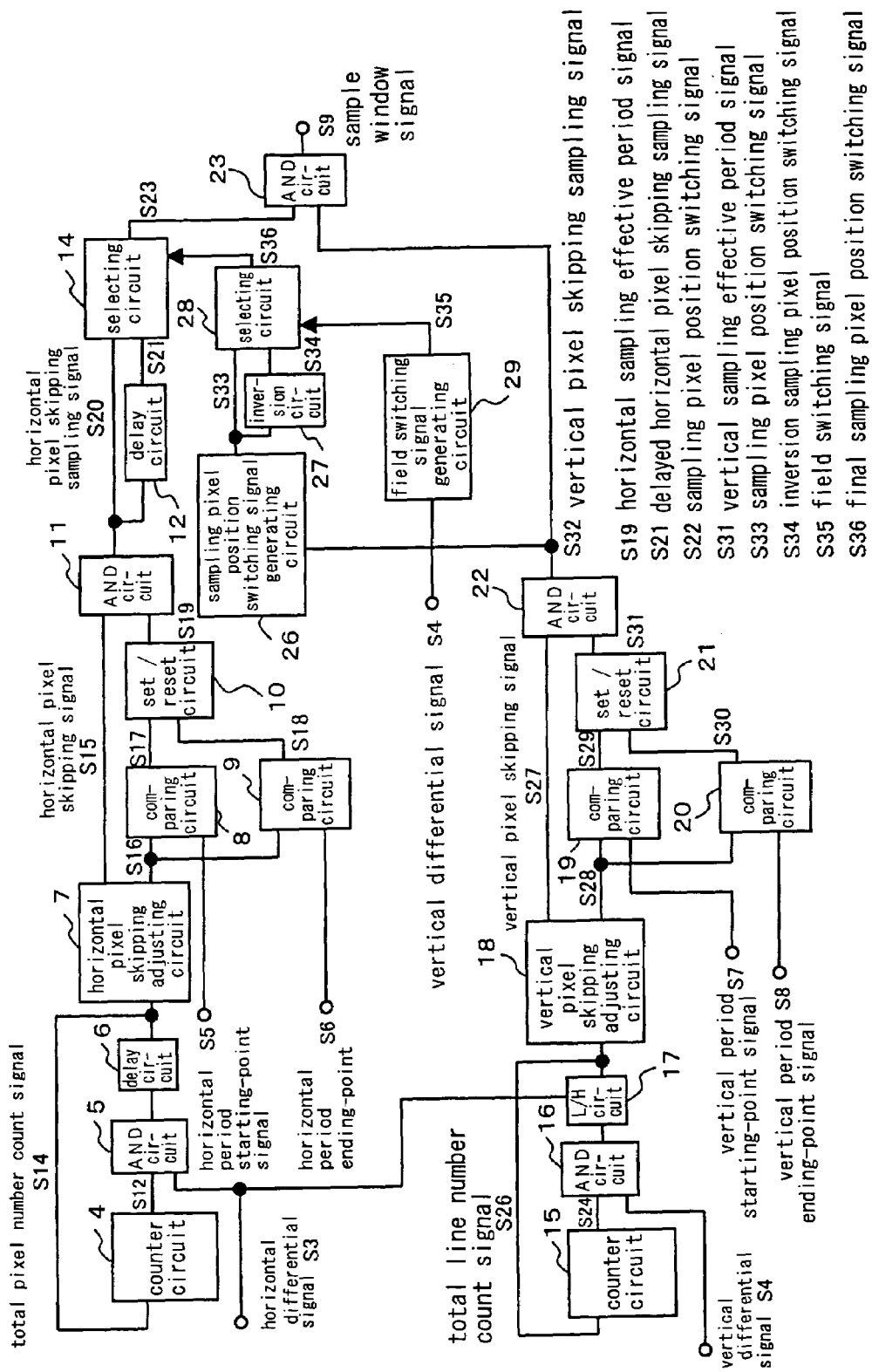

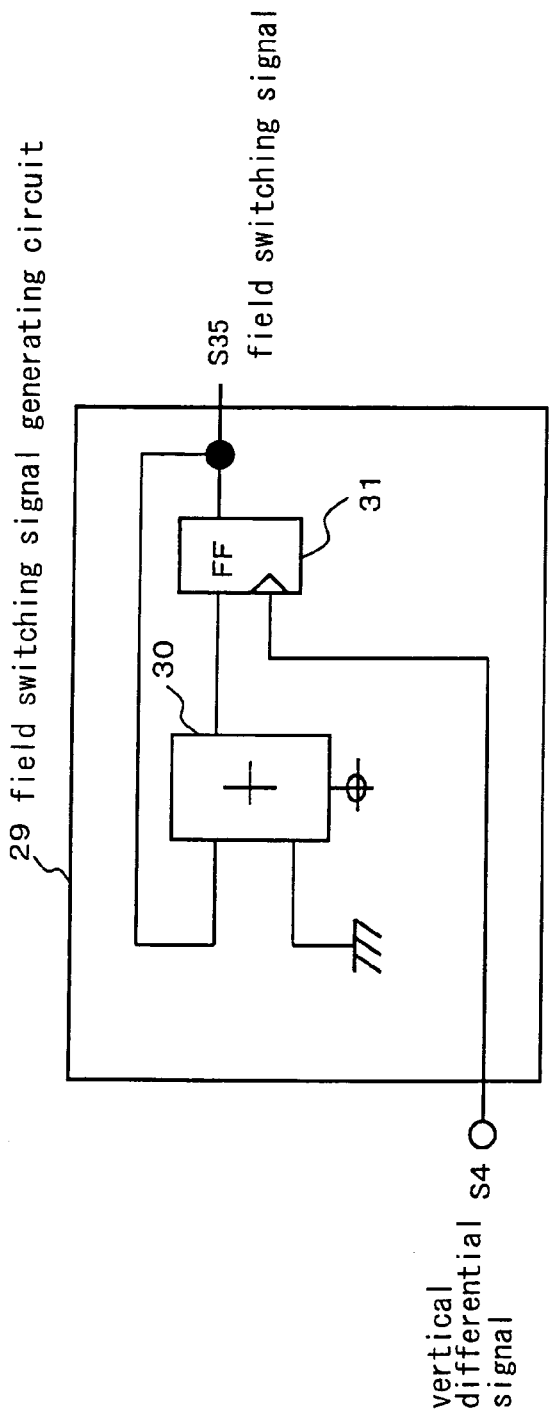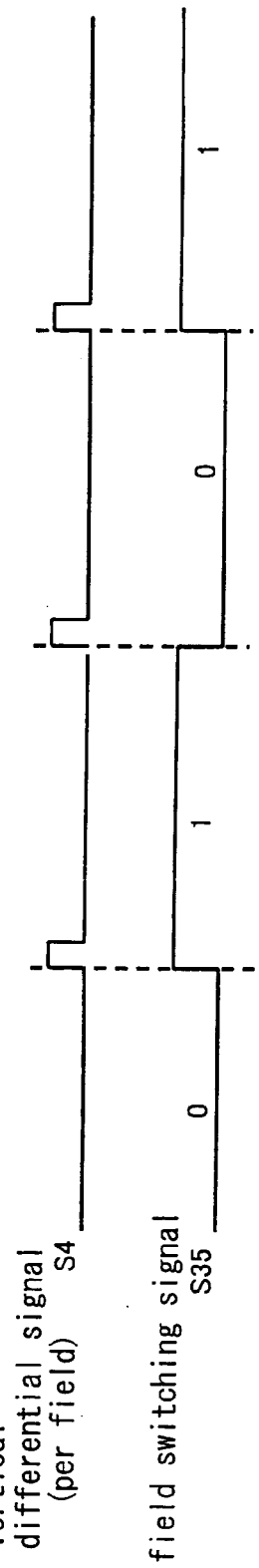

F I G. 1 5 A
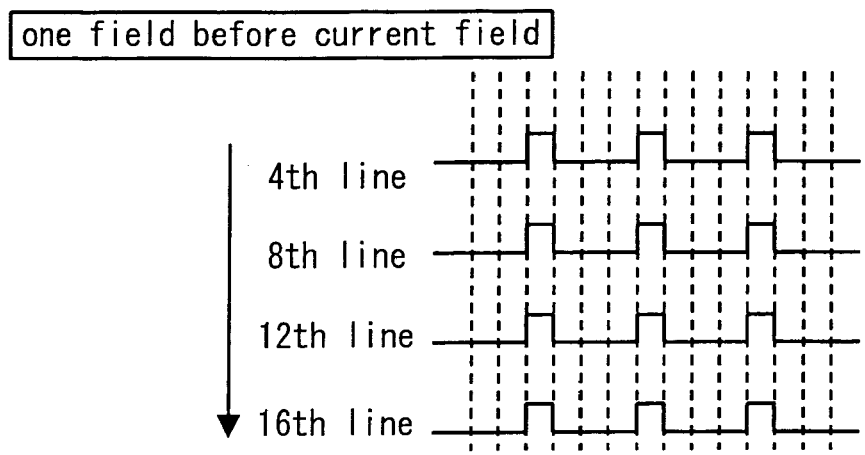
F I G. 1 5 B
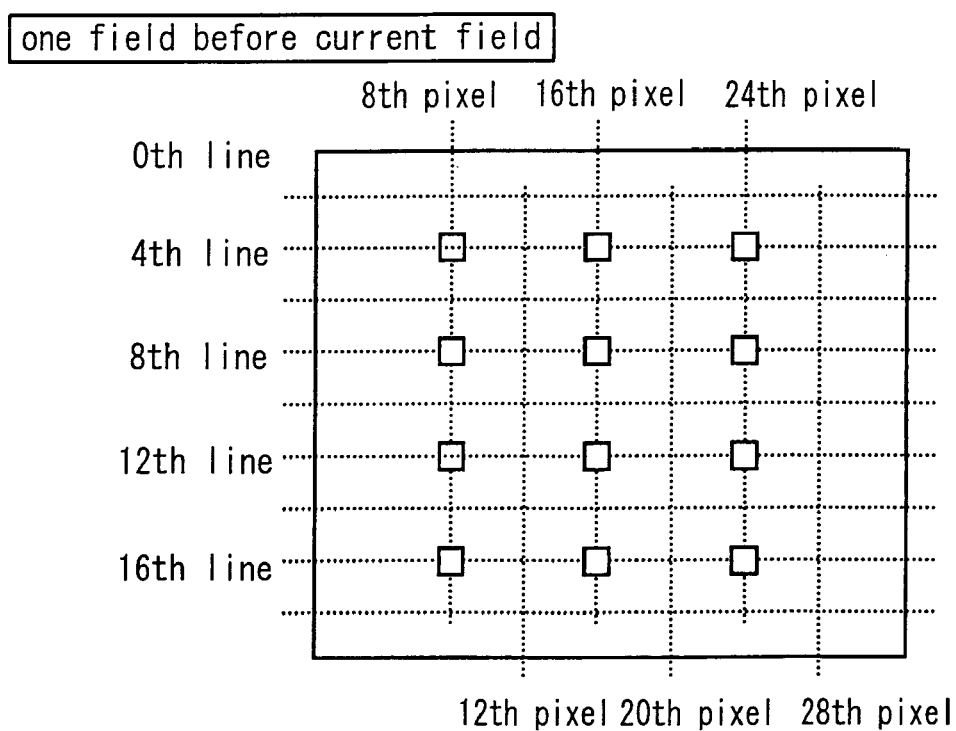

F I G. 1 5 C
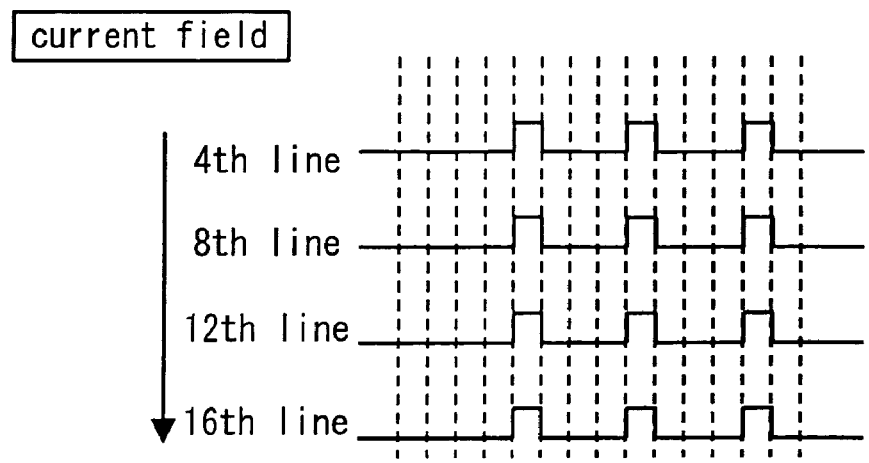
F I G. 1 5 D
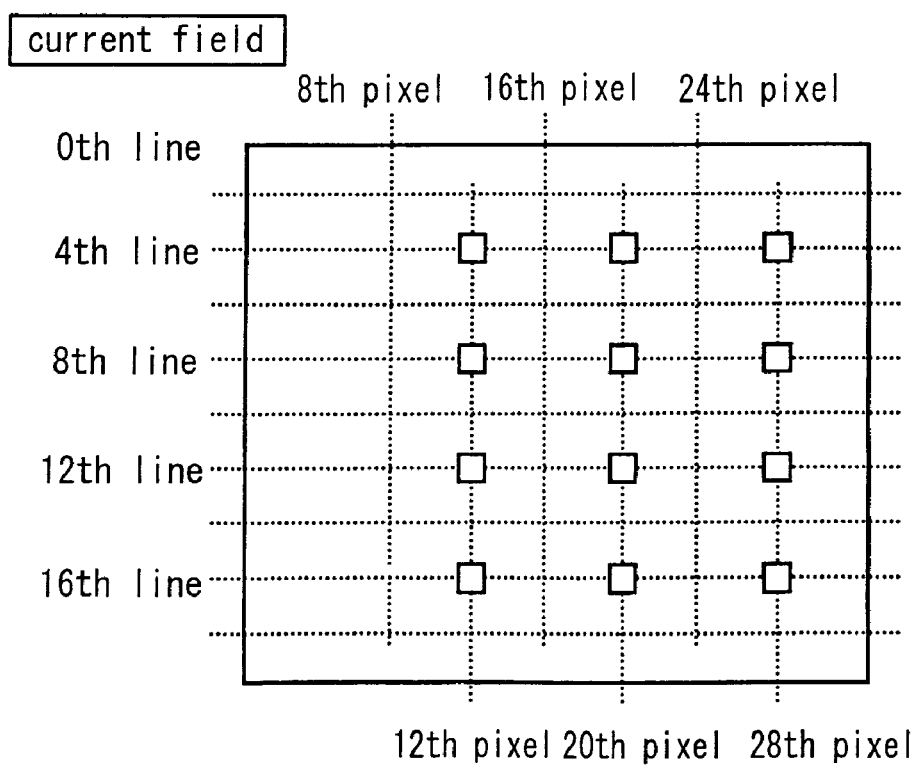

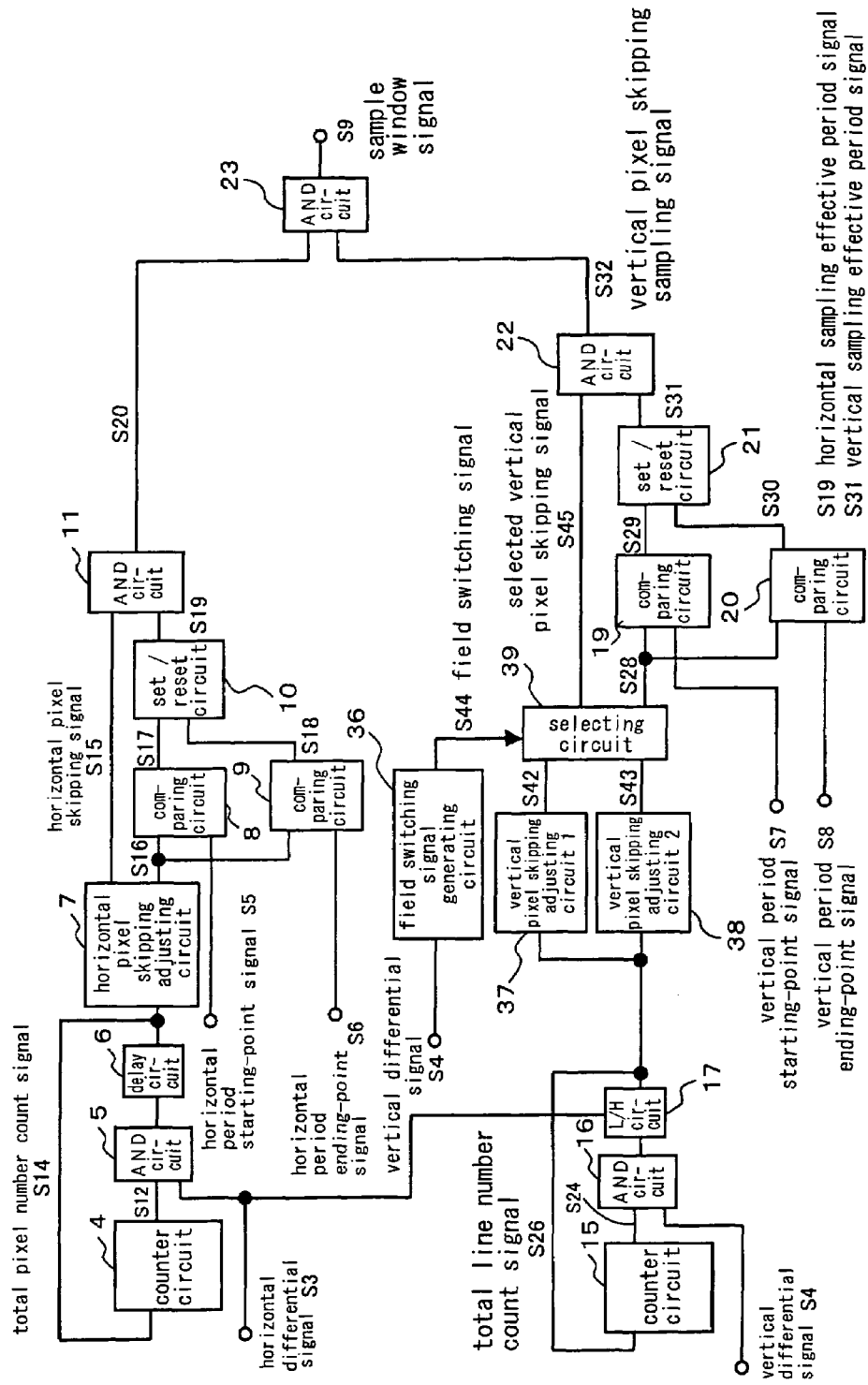

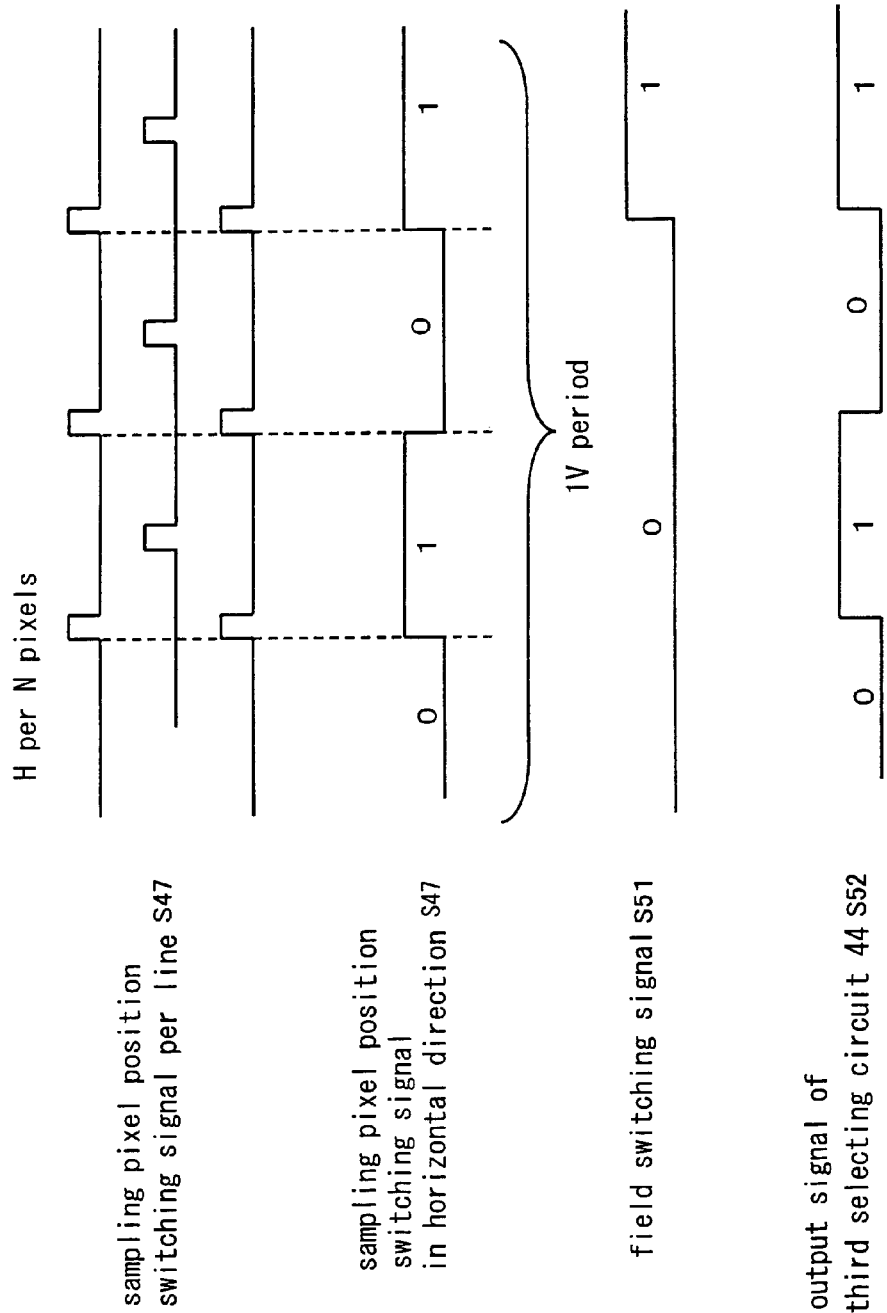

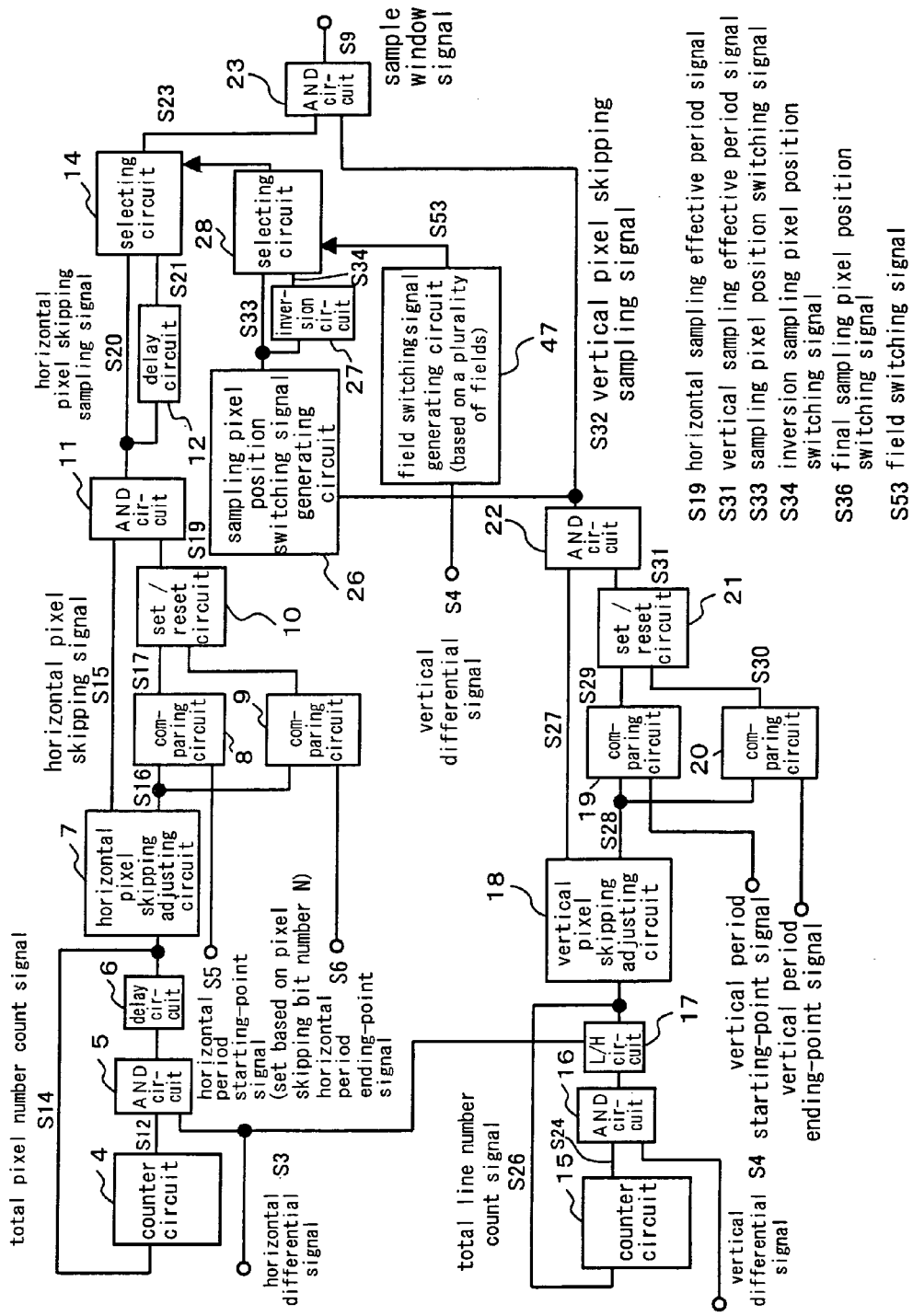

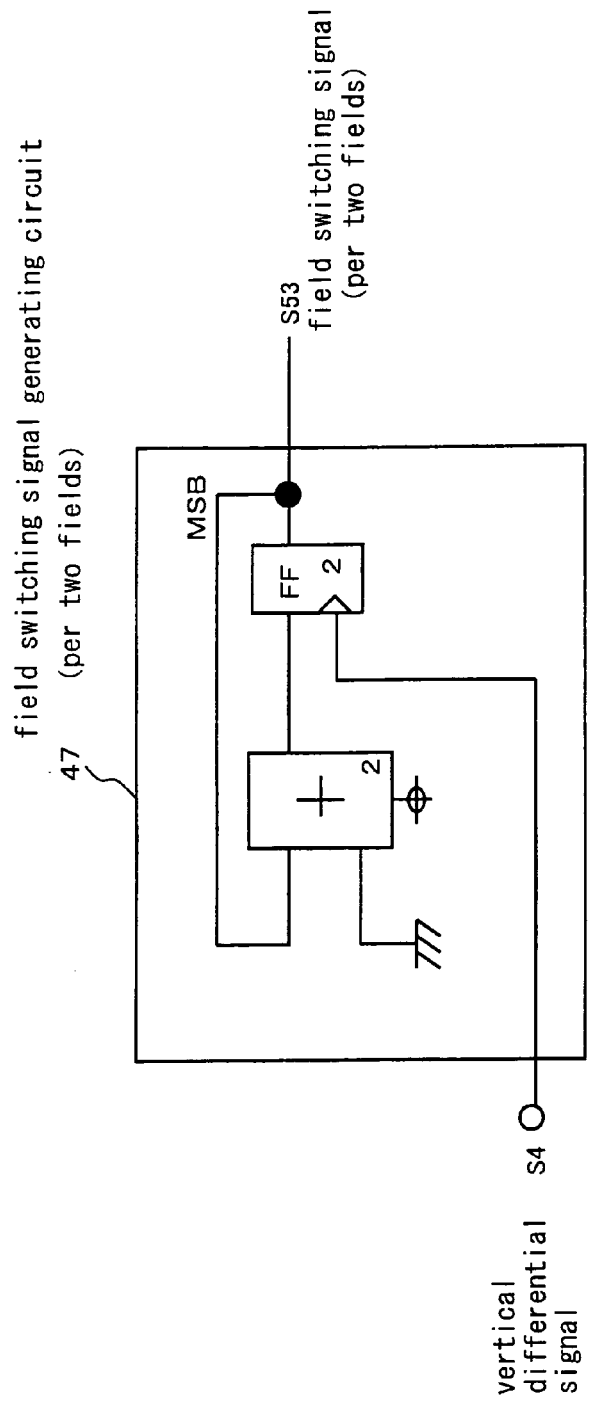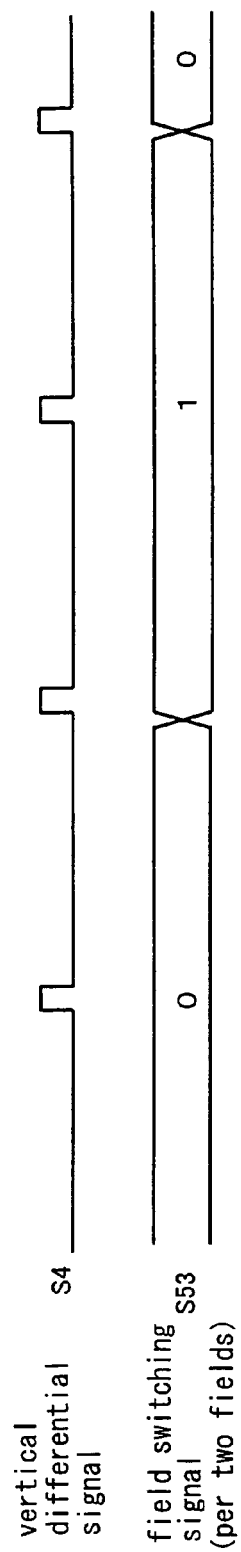

| | | | | | | | | |
|---|---|---|---|---|---|---|---|---|
| 1th line | 00 | 01 | 10 | 11 | 00 | 01 | 10 | 11 |
| 2nd line | 01 | 10 | 11 | 00 | 01 | 10 | 11 | 00 |
| | 10 | 11 | 00 | 01 | 10 | 11 | 00 | 01 |
| | 11 | 00 | 01 | 10 | 11 | 00 | 01 | 10 |

(b)

1th line

2nd line (c)

1th line

2nd line

BRIGHTNESS SIGNAL PROCESSING APPARATUS

RELATED APPLICATIONS

This application is the U.S. National Phase under 35 U.S.C. § 371 of International Application No. PCT/JP2005/007514, filed on Apr. 20, 2005, which in turn claims the benefit of Japanese Application No. 2004-127701, filed Apr. 23, 2004, the disclosures of which Applications are incorporated by reference herein.

FIELD OF THE INVENTION

The present invention relates to a brightness signal processing apparatus and a brightness signal processing method for performing a sampling processing to a video brightness signal.

BACKGROUND OF THE INVENTION

In recent years, digitalization of a video signal has been increasingly proceeded, wherein a brightness signal sampling processing is adopted in processing the video signal (For example, see the Patent Document 1).

FIG. 24 is a block diagram of a brightness signal sampling processing apparatus according to a conventional technology.

A pixel skipping standard value setting unit 401 in the sampling processing apparatus in the conventional brightness signal processing apparatus is constituted as below. First, a counter 501 is reset every time when a vertical differential signal S211 is inputted. A load hold device 503 loads an output from the counter 501 based on a horizontal differential signal S210. The load hold device 503 supplies the loaded output value from the counter 501 to the counter 501 as the input of the counter 501. The counter 501 counts number of lines by counting the output value of the load hold device 503.

Next, n bits, which is number of bits corresponding to a repeated pattern of the brightness signals for skipping pixels desirably from the number of the lines outputted by the load hold device 503, are retrieved from lower-order bits and supplied to the counter 502. In the lower-order bits described here, as they are retrieved from the output of the load hold device 503, the retrieved n bits change in such manner as 0, 1, 2, 3, 0, 1, 2, 3, . . . in the case of, for example, n=2 every time when the number of the lines to be processed changes.

Next, the counter 502 counts as much as the lower-order n bits retrieved from the load hold device 503 as an initial value in accordance with a reference clock. Because the initial value supplied to the counter 502 is different with respect to each of the lines processed by as much as the lower-order n bits of the load hold device 503, a value at which the counting starts is different per line. The output of the counter 502 is a pixel skipping standard value S411.

FIG. 25 shows a conventional sampling example (an example in which the pixel skipping standard value S411 is generated). In the drawing, one square corresponds to one pixel on a display screen, and a vertical direction corresponds to lines. Referring to the pixel skipping standard value S411 in FIG. 25, the value in the first line is "00", the value in the second line is "01" of a binary numeral, the value in the third line is "10", the value in the fourth line is "11", and the value in the fifth line is "00", and a position where the counting starts is different with respect to each line. Such a circuit configuration allows the brightness signal to be sampled not only in the fixed pixels but also in the pixels in an oblique direction on the screen.

Patent Document 1: WO01/039489 (Pages 11-14, FIGS. 5-7)

DISCLOSURE OF THE INVENTION

Problem to be Solved by the Invention

However, when the brightness signal on the screen is sampled in the conventional brightness signal processing apparatus, the brightness signal is sampled at pixel skipping positions only in the oblique direction on a scanning line. Therefore, when a pattern such as a fixed pattern or a repeated pattern appears in the oblique direction, it is difficult to accurately and equally detect brightness signal levels. As a result, there has been a problem that the accuracy in the detection of these brightness signal levels unfavorably deteriorated when an average brightness level and a maximum/minimum level of the brightness signals on the entire screen are detected in a post-treatment.

The present invention solves the conventional problem described above, and a main object thereof is to provide a brightness signal processing apparatus capable of accurately and equally sampling the brightness signal in the vertical, horizontal and oblique directions on the screen when the brightness signal of the fixed pattern or the repeated pattern in the oblique direction is inputted by adjusting sampling pixel position per line and per field in the sampling of the brightness signal without enlarging circuits.

Means For Solving The Problem

In order to achieve the foregoing object, in the present invention, the sampling pixel position on the scanning line is adjusted per line and per field so that the sampling positions can be designated randomly and equally in the vertical, horizontal and oblique directions on the screen.

More specifically, a brightness signal processing apparatus according to the present invention comprises the following plurality of constituent elements, which are:

a differential operation circuit for outputting a horizontal differential signal synchronizing with a horizontal synchronous signal of an inputted video signal and a vertical differential signal synchronizing with a vertical synchronous signal of the inputted video signal by detecting and differentiating rise edges or breaking edges of the vertical synchronous signal and the horizontal synchronous signal;

a sample window circuit for detecting starting positions or ending positions of a horizontal period and a vertical period and generating sample window signal set at arbitrary position in vertical and horizontal directions on a screen in accordance with the horizontal and vertical differential signals; and a brightness signal output circuit for selectively outputting a sampled brightness signal when the sample window circuit is effective.

A brightness signal processing apparatus according to the present invention may comprise the following plurality of constituent elements, which are:

a differential operation circuit for outputting a horizontal differential signal synchronizing with the horizontal synchronous signal of an inputted video signal and a vertical differential signal synchronizing with the vertical synchronous signal of the inputted video signal by detecting and differentiating rise edges or breaking edges of the vertical synchronous signal and the horizontal synchronous signal;

a first counter circuit for counting number of pixels in one horizontal period by resetting the horizontal differential signal;

a first logic operation AND circuit for executing an AND processing between the horizontal differential signal and an output signal of the first counter circuit;

a first delay circuit for delaying an output signal of the first AND circuit per clock;

a horizontal pixel skipping adjusting circuit for skipping pixels from an output signal of the first delay circuit while adjusting number of the pixels to be skipped in the one horizontal period;

a first set/reset circuit for receiving a horizontal period starting-point signal which sets a starting point of a horizontal period of a sample window period and a horizontal period ending-point signals which sets an ending point thereof, the first set/reset circuit further setting a first sampling effective period in the horizontal period which is set at a point at which an output result of the horizontal pixel skipping adjusting circuit and the horizontal period starting-point signal are coincident with each other and reset at a point at which the output result of the horizontal pixel skipping adjusting circuit and the horizontal period ending-point signal are coincident with each other;

a second AND circuit for detecting a point at which the first sampling effective period and the output result of the horizontal pixel skipping adjusting circuit are coincident with each other;

a second delay circuit for delaying an output signal of the second AND circuit by N number of pixels (N is a natural number of at least 1);

a first sampling pixel position switching signal generating circuit for generating a sampling pixel position switching signal which repeats inversion in each horizontal cycle from the horizontal differential signal; and a first selecting circuit for selecting one out of the output signal of the second AND circuit and an output signal of the second delay circuit based on the sampling pixel position switching signal and outputting the selected signal as a sample window signal.

According to the foregoing constitution, a total number of the pixels in one horizontal period is counted by the first counter circuit, first AND circuit and first delay circuit. Then, the number of the sampling pixels in one horizontal period is skipped by the horizontal pixel skipping adjusting circuit. For example, when the pixels are skipped at every (N×2) pixels, a pixel skipping signal where one is an effective bit and the other is an ineffective bit every the (N×2) pixels is generated.

The set/reset circuit determines the sampling effective period from the horizontal period starting-point signal, the horizontal period ending-point signal and the output result of the horizontal pixel skipping adjusting circuit. The output of the second AND circuit showing the detection result of the point at which the sampling effective period and the pixel skipping signal are coincident with each other determines the sample window period in the horizontal direction for sampling per the (N×2) pixels. The second delay circuit further delays the sample window period per the (N×2) pixels by the N number of pixels. Thereby, the two sample window periods having the different horizontal positions respectively can be obtained as a selection candidate. These two sample window periods as a selection candidate are inputted to the first selecting circuit.

The sampling pixel position switching signal generating circuit generates the sampling pixel position switching signal which repeats the inversion of 0, 1, 0, 1, . . . in each horizontal cycle (each line) based on the horizontal differential signal. The first selecting circuit is controlled based on the sampling pixel position switching signal. As a result, a first sample window period is selected in a horizontal period and a second sample window period is selected in a subsequent horizontal period in the first selecting circuit. Then, the sample window signals, which are alternately selected in each horizontal period, are obtained through the switched selections.

More specifically, for example, the (N×2)th pixel, (N×4)th pixel, (N×6)th pixel, . . . are sampled in the even-numbered lines, while the (N×3)th pixel, (N×5)th pixel, (N×7)th pixel, . . . are sampled in the odd-numbered lines. For example, provided that N=4, the eighth pixel, 16th pixel, 24th pixel, . . . are sampled in the even-numbered lines, while the 12th pixel, 20th pixel, 28th pixel are sampled in the odd-numbered lines.

According to the foregoing constitution, the skipping pixel interval is adjusted in the horizontal pixel skipping adjusting circuit so that the sampling pixel position on the scanning line can be adjusted per line. As a result, the sampling positions can be arbitrarily and equally designated in the horizontal direction on the screen. Therefore, the brightness signal can be accurately sampled with respect to the patterns such as the fixed pattern and the repeated pattern. Further, it is unnecessary to sample all of the pixels when the brightness signal is sampled, and the foregoing constitution can be effectively applied to broadcast systems of a plurality of types whose respective numbers of effective pixels are different.

The brightness signal processing apparatus according to the present invention may further comprise the following constituent elements, which are:

a second counter circuit for counting all of lines in one vertical period;

a third AND circuit for executing an AND processing between the vertical differential signal and an output signal of the second counter circuit;

a load hold circuit for load-holding an output signal of the third AND circuit based on the horizontal differential signal;

a vertical pixel skipping adjusting circuit for skipping lines from all of the lines in the one vertical period while adjusting number of the lines to be skipped based on an output signal of the load hold circuit;

a third comparing circuit for comparing a signal obtained by bit-shifting an output signal of the vertical pixel skipping adjusting circuit and the vertical period starting-point signal;

a fourth comparing circuit for comparing the signal obtained by bit-shifting the output signal of the vertical pixel skipping adjusting circuit and the vertical period ending-point signal;

a second set/reset circuit for generating a second sampling effective period signal based on a result of the comparison by the third comparing circuit and a result of the comparison by the fourth comparing circuit;

a fourth AND circuit for executing an AND processing between the second sampling effective period signal and the output signal of the vertical pixel skipping adjusting circuit;

a sampling pixel position switching signal generating circuit for generating a sampling pixel position switching signal which repeats inversion per a predetermined number of pixel skipping lines from an output signal of the fourth AND circuit; and a fifth AND circuit for generating a sample window signal by executing the AND processing between an output signal of the first selecting circuit and an output signal of the fourth AND circuit.

According to the foregoing constitution, the pixel skipping interval is adjusted in the horizontal pixel skipping adjusting circuit so that the sampling pixel position on the scanning line can be adjusted per line. Further, the line skipping interval is adjusted in the vertical pixel skipping adjusting circuit so that the sampling pixel positions on the scanning line can be adjusted per the predetermined number of lines. Thereby, the sampling positions can be arbitrarily and equally designated in the horizontal, vertical and oblique directions on the screen. Therefore, the brightness signal can be accurately sampled with respect to the patterns such as the fixed pattern and the repeated pattern. Further, it is unnecessary to sample all of the pixels when the brightness signal is sampled, and the foregoing constitution can be effectively applied to broadcast systems of a plurality of types whose respective numbers of effective pixels are different.

The brightness signal processing apparatus according to the present invention may further comprise the following constituent elements, which are:

an inversion circuit for generating an inversion sampling pixel position switching signal by inverting the sampling pixel position switching signal;

a field switching signal generating circuit for generating a field switching signal which repeats inversion in each vertical cycle from the vertical differential signal; and a second selecting circuit for selecting one from the sampling pixel position switching signal and the inversion sampling pixel position switching signal based on the field switching signal, wherein the first selecting circuit is controlled based on the sampling pixel position switching signal from the second selecting circuit in place of the sampling pixel position switching signal from the sampling pixel position switching signal generating circuit.

Furthermore, in the foregoing constitution, the field switching signal generating circuit can constitute with a delay circuit to which the vertical differential signal is supplied as a clock and an adding circuit for counting-up an output of the delay circuit.

According to this constitution, the adjustment of the sampling pixel positions on the scanning line per the predetermined number of lines can be switched per field.

The brightness signal processing apparatus according to the present invention may comprise:

a plurality of horizontal pixel skipping adjusting circuits respectively having different pixel skipping intervals in place of the horizontal pixel skipping adjusting circuit; and a selecting circuit for selecting one from output signals of the plurality of horizontal pixel skipping adjusting circuits based on the sampling pixel position switching signal and outputting the selected output signal to the second AND circuit in place of the output signal of the second delay circuit and the output signal of the first selecting circuit.

According to the foregoing constitution, the sampling positions can be arbitrarily designated along the horizontal, vertical and oblique directions on the screen. Further, the sampling number is made variable in order to be able to further improve the arbitrariness.

Further, the sampling pixel position switching signal generating circuit may generate a field switching signal which controls the first selecting circuit in each vertical period from the vertical differential signal in place of generating the sampling pixel position switching signal from the output signal of the fourth AND circuit.

According to the foregoing constitution, the sampling positions can be arbitrarily designated in the horizontal direction on the screen. Further, the arbitrariness can be further improved by shifting the sampling pixel position per field.

The brightness signal processing apparatus according to the present invention may comprise:

a plurality of vertical pixel skipping adjusting circuits respectively having different pixel skipping intervals in place of the vertical pixel skipping adjusting circuit;

a field switching signal generating circuit for generating a field switching signal which repeats inversion in each vertical cycle from the vertical differential signal in place of the second delay circuit, the first selecting circuit and the sampling pixel position switching signal generating circuit; and a selecting circuit for selecting one of output signals of the plurality of vertical pixel skipping adjusting circuit based on the field switching signal and outputting the selected output signal to the fourth AND circuit.

According to the foregoing constitution, the sampling positions can be arbitrarily designated along the vertical direction on the screen. Further, the number of the sampling lines is variable per field in order to be able to further improve the arbitrariness.

The following plurality of constituent elements may be added to the brightness signal processing apparatus according to the present invention wherein the sampling pixel position switching signal generating circuit generates the sampling pixel position switching signal based on the output signal of the vertical pixel skipping adjusting circuit in place of the output signal of the fourth AND circuit, the brightness signal processing apparatus further comprising the following plurality of constituent elements:

a sampling line position switching signal generating circuit for generating a sampling line position switching signal which changes a sampling line position based on the output signal of the horizontal pixel skipping adjusting circuit used as a reset signal;

an inversion circuit for inverting the sampling line position switching signal;

a field switching signal generating circuit for generating a field switching signal which changes the sampling line position based on the output signal of the vertical differential signal used as a reset signal;

a third selecting circuit for selecting one from the sampling line switching signal and an output signal of the inversion circuit based on the field switching signal;

a line memory for switching the sampling pixel position per line in the vertical direction by delaying the output signal of the vertical pixel skipping adjusting circuit; and a fourth selecting circuit for selecting one from the output signal of the vertical pixel skipping adjusting circuit and an output signal of the line memory circuit based on an output signal of the third selecting circuit.

According to the foregoing constitution, the sampling positions can be arbitrarily and equally designated along the horizontal, vertical and oblique directions on the screen. Further, the arbitrariness and the equality can be further improved by shifting the sampling pixel position per field in the vertical direction.

The field switching signal generating circuit may generate a field switching signal which switches the second selecting circuit per a plurality of fields based on the vertical differential signal used as a reset signal, and the sampling line position may be switched per the plurality of fields based on the field switching signal.

According to the foregoing constitution, the sampling positions can be arbitrarily and equally designated along the horizontal, vertical and oblique directions on the screen. Further, the arbitrariness and the equality can be further improved by shifting the sampling pixel position per the plurality of fields in the horizontal direction.

If the present invention is regarded a brightness signal processing method, the method comprises the steps:

a differential operation step in which rise and breaking edges in a horizontal synchronous signal and a vertical synchronous signal of an inputted video signal are detected and differentiated so that a horizontal differential signal synchronizing with the horizontal synchronous signal and a vertical differential signal synchronizing with the vertical synchronous signal are outputted;

a sampling window generating step in which starting positions and ending positions of a horizontal period and a vertical period are detected, and sample window signal set at arbitrarily position in the vertical and horizontal direction on the screen are generated based on the horizontal and vertical differential signals; and a track signal outputting step in which a sampled brightness signal is selectively outputted when the sample window signal is effective.

The respective circuits constituting the present invention described above are able to consist of not only a combination of electronic parts and wiring patterns but also software programs.

EFFECTS OF THE INVENTION

As described above, according to the brightness signal processing apparatus of the present invention, the sampling pixel positions on the scanning line are adjusted per N lines or M fields (N and M are natural numbers equal to or more than 1) so that the sampling positions can be arbitrarily and equally designated along the vertical and oblique directions on the screen. As a result, the brightness signal can be accurately sampled with respect to the patterns such as the fixed pattern and the repeated pattern.

Further, it is unnecessary to sample all of the pixels when the brightness signal is sampled, which allows a circuit size to be reduced.

Further, the brightness signal can be accurately sampled in various broadcast systems (NTSC, PAL, 750P, XGA, SXG, UXGA and the like) respectively having different numbers of effective pixels and different numbers of lines.

BRIEF DESCRIPTION OF THE DRAWINGS

FIG. 2 is a diagram showing a state where a horizontal sample window signal according to the present invention is generated.

FIG. 3 is a diagram showing a state where a vertical sample window signal according to the present invention is generated.

FIG. 4 is a block diagram illustrating a constitution of a sample window circuit according to a preferred embodiment 1 of the present invention.

FIG. 5A is a block diagram illustrating a constitution of a sampling pixel position switching signal generating circuit according to the preferred embodiment 1.

FIG. 5B is a timing chart of the sampling pixel position switching signal generating circuit window circuit according to the preferred embodiment 1.

FIG. 7 is a block diagram illustrating a constitution of a sample window circuit according to a preferred embodiment 2 of the present invention.

FIG. 9 is a block diagram illustrating a constitution of a sample window circuit according to a preferred embodiment 3 of the present invention.

FIG. 10A is a block diagram illustrating a constitution of a field switching signal generating circuit according to the preferred embodiment 3.

FIG. 10B is a timing chart of the field switching signal generating circuit according to the preferred embodiment 3.

FIG. 15A is a first drawing showing a state of a sample window signal according to the preferred embodiment 5.

FIG. 15B is a second drawing showing the state of the sample window signal according to the preferred embodiment 5.

FIG. 15C is a third drawing showing the state of the sample window signal according to the preferred embodiment 5.

FIG. 15D is a fourth drawing showing the state of the sample window signal according to the preferred embodiment 5.

FIG. 16 is a block diagram illustrating a constitution of a sample window circuit according to a preferred embodiment 6 of the present invention.

FIG. 19 is a timing chart illustrating an operation according to the preferred embodiment 7.

FIG. 21 is a block diagram illustrating a constitution of a sample window circuit according to a preferred embodiment 8 of the present invention.

FIG. 22A is a block diagram illustrating a constitution of a field switching signal generating circuit per a plurality of fields according to the preferred embodiment 8.

FIG. 22B is a timing chart of the field switching signal generating circuit according to the preferred embodiment 8.

FIG. 25 is a drawing showing a state of a sample window signal in the conventional brightness signal processing apparatus.

DESCRIPTION OF REFERENCE SYMBOLS

Figure 1:
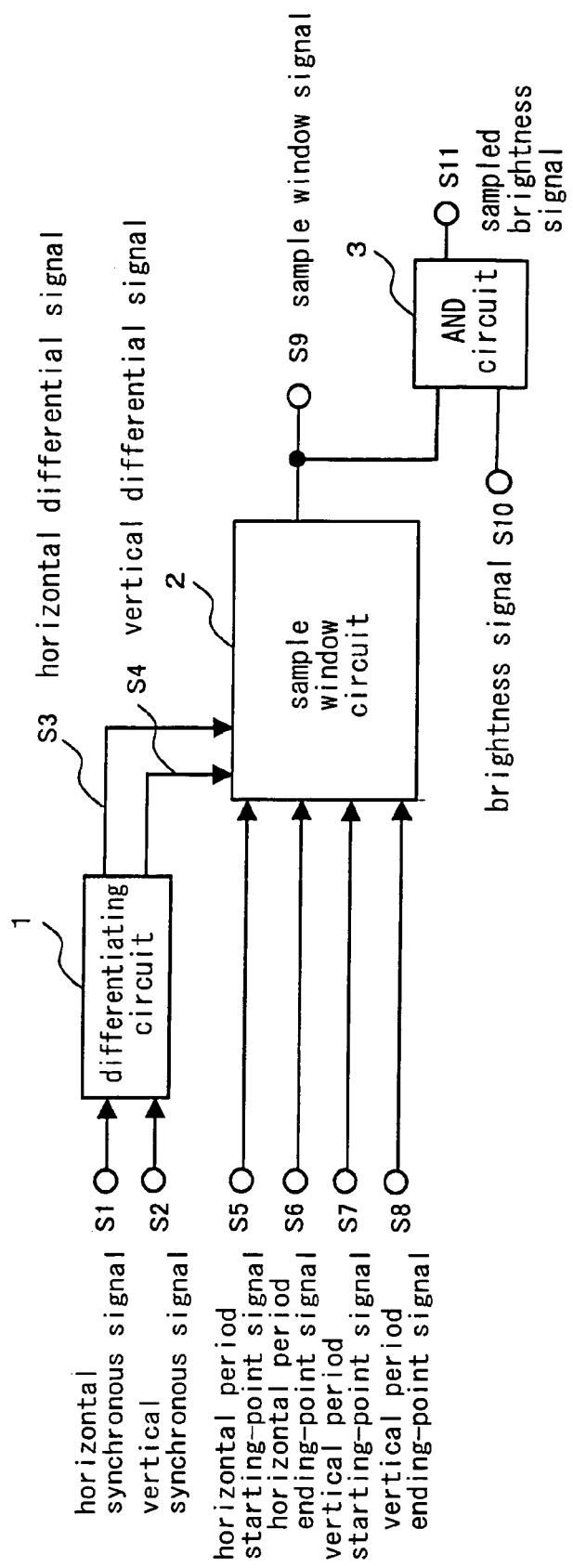
FIG. 1 is a block diagram illustrating an entire constitution of a brightness signal processing apparatus according to the present invention.

1 . . . differential operation circuit
2 . . . sample window circuit
3 . . . first AND circuit
4 . . . first counter circuit
5 . . . second AND circuit
6 . . . first delay circuit
7 . . . horizontal pixel skipping adjusting circuit
8 . . . first comparing circuit
9 . . . second comparing circuit
10 . . . first set/reset circuit
11 . . . third AND circuit
12 . . . second delay circuit
13 . . . sampling pixel position switching signal generating circuit
14 . . . first selecting circuit
15 . . . second counter circuit
16 . . . third AND circuit
17 . . . load hold circuit
18 . . . vertical pixel skipping adjusting circuit
19 . . . third comparing circuit
20 . . . fourth comparing circuit
21 . . . second set/reset circuit
22 . . . fourth AND circuit
23 . . . fifth AND circuit
24 . . . counter circuit
25 . . . delay circuit
26 . . . sampling pixel position switching signal generating circuit
27 . . . inversion circuit
28 . . . second selecting circuit
29 . . . field switching signal generating circuit
30 . . . counter circuit
31 . . . delay circuit
32 . . . first horizontal pixel skipping adjusting circuit
33 . . . second horizontal pixel skipping adjusting circuit
34 . . . selecting circuit
35 . . . field switching signal generating circuit
36 . . . field switching signal generating circuit
37 . . . first vertical pixel skipping adjusting circuit
38 . . . second vertical pixel skipping adjusting circuit
39 . . . selecting circuit
40 . . . sampling pixel position switching signal generating circuit
41 . . . sampling line position switching signal generating circuit
42 . . . inversion circuit
43 . . . field switching signal generating circuit
44 . . . third selecting circuit
45 . . . line memory
46 . . . fourth selecting circuit
47 . . . field switching signal generating circuit per a plurality of fields
S1 . . . horizontal synchronous signal
S2 . . . vertical synchronous signal
S3 . . . horizontal differential signal
S4 . . . vertical differential signal
S5 . . . horizontal period starting-point signal
S6 . . . horizontal period ending-point signal
S7 . . . vertical period starting-point signal
S8 . . . vertical period ending-point signal
S9 . . . sample window signal
S10 . . . video brightness signal
S11 . . . post-sample window brightness signal
S12 . . . count signal
S14 . . . total pixel number count signal
S15 . . . horizontal pixel skipping signal
S16 . . . bit shift signal
S17,S18 coincidence detection signal
S19 . . . horizontal sampling effective period signal
S20 . . . horizontal pixel skipping sampling signal
S21 . . . delayed horizontal pixel skipping sampling signal
S22 . . . sampling pixel position switching signal
S26 . . . total line number count signal
S27 . . . vertical pixel skipping signal
S27a . . . delayed vertical pixel skipping signal
S28 . . . bit shift signal
S29,S30 coincidence detection signal
S31 . . . vertical sampling effective period signal
S32 . . . vertical pixel skipping sampling signal
S33 . . . sampling pixel position switching signal
S34 . . . inversion sampling pixel position switching signal
S35 . . . field switching signal
S36 . . . final sampling pixel position switching signal
S38,S39 horizontal pixel skipping signal
S41 . . . field switching signal
S42,S43 vertical pixel skipping signal
S44 . . . field switching signal
S47 . . . sampling pixel position switching signal
S49 . . . sampling line position switching signal
S50 . . . inversion sampling line position switching signal
S51,S53 field switching signal

PREFERRED EMBODIMENTS OF THE PRESENT INVENTION

Hereinafter, preferred embodiments of a brightness signal processing apparatus according to the present invention are described in detail referring to the drawings.

FIG. 1 is a block diagram of a brightness signal processing apparatus according to the present invention.

A horizontal synchronous signal S1 and a vertical synchronous signal S2 retrieved from a video signal are inputted to a differential operation circuit 1. The differential operation circuit 1 detects and differentiates edges of the horizontal synchronous signal S1 and the vertical synchronous signal S2 to thereby output a horizontal differential signal S3 and a vertical differential signal S4. The detection of edges may be carried out to either rise edges or breaking edges. In order to detect the rise edge of the horizontal synchronous signal S1, the horizontal synchronous signal S1 is delayed (for example, delayed by one clock), and a logical product of a signal obtained by inverting the delayed signal and the horizontal synchronous signal S1 is obtained. In order to detect the breaking edge of the horizontal synchronous signal S1, a logical product of the signal obtained by inverting the horizontal synchronous signal S1 and the signal obtained by delaying the horizontal synchronous signal S1 (for example, delayed by one clock) is obtained. In like wise, the vertical differential signal S4 can be also obtained based on the constitution for generating the horizontal differential signal S3 described above.

To a sample window circuit 2 are inputted the horizontal differential signal S3, the vertical differential signal S4, a horizontal period starting-point signal S5 which is a starting point when the brightness signal is horizontally sampled, a horizontal period ending-point signal S6 which is an ending point when the brightness signal is horizontally sampled, a vertical period starting-point signal S7 which is a starting point when the brightness signal is vertically sampled, and a vertical period ending-point signal S8 which is an ending point when the brightness signal is vertically sampled. The sample window circuit 2 generates a sample window signal S9 from the signals S3-S8 and outputs the generated signal.

FIG. 2 shows a state where a horizontal sample window period is generated. In FIG. 2, a value of the horizontal period starting-point signal S5 is "10", and a value of the horizontal period ending-point signal S6 is "250" as an example. Number of pixels in one horizontal period is counted by the horizontal differential signal S3, and a point at which the count number of the pixels in the one horizontal period is coincident with the value of the horizontal period starting-point signal S5 is a starting point of the sample window period in the horizontal direction. Further, a point at which the count number of the pixels in the one horizontal period is coincident with the value of the horizontal period ending-point signal S6 is an ending point of the sample window period in the horizontal direction.

FIG. 3 shows a state where a vertical sample window period is generated. In FIG. 3, a value of the vertical period starting-point signal S7 is "10", and a value of the vertical period ending-point signal S8 is "250" as an example. Number of pixels in one vertical period is counted by the vertical differential signal S4, and a point at which the count number of the pixels in the one vertical period is coincident with the value of the vertical period starting-point signal S7 is a starting point of the sample window period in the vertical direction. Further, a point at which the count number of the pixels in the one vertical period is coincident with the value of the vertical period ending-point signal S8 is an ending point of the sample window period in the vertical direction.

The sample window signal S9 is ultimately outputted from the sample window circuit 2 by executing an AND processing between the sample window period in the horizontal direction and the sample window period in the vertical direction. Further, the sample window signal S9 and the video brightness signal S10 are inputted to the AND circuit 3 so that a sample-window-treated brightness signal s11 can be obtained.

Preferred Embodiment 1

FIG. 4 is a block diagram illustrating a sample window circuit 2 according to a preferred embodiment 1 of the present invention. Referring to reference numerals shown in FIG. 4, 4 denotes a first counter circuit for adding pixel data of the brightness signal in one horizontal period, 5 denotes a first AND circuit to which the horizontal differential signal S3 and a count signal S12 of the first counter circuit 4 are inputted, 6 denotes a first delay circuit, and 7 denotes a horizontal pixel skipping adjusting circuit for skipping the pixel data of the brightness signal in one horizontal period. The horizontal pixel skipping adjusting circuit 7 can adjust an interval at which the pixels are skipped. 8 denotes a first comparing circuit for comparing an output of the horizontal pixel skipping adjusting circuit 7 (bit shift signal S16 which is bit-shifted) and the horizontal period starting-point signal S5. 9 denotes a second comparing circuit for comparing the bit shift signal S16 and the horizontal period ending-point signal S6. 10 denotes a first set/reset circuit for setting an output of the first comparing circuit 8 and an output of the second comparing circuit 9 in a sampling effective period. 11 denotes a second AND circuit for executing the AND processing between a sampling effective period signal S19 in the horizontal direction outputted from the first set/reset circuit 10 and a horizontal pixel skipping signal S15 outputted from the horizontal pixel skipping adjusting circuit 7. 12 denotes a second delay circuit. 13 denotes a sampling pixel position switching signal generating circuit for generating a sampling pixel position switching signal S22. The sampling pixel position switching signal generating circuit 13 generates the sampling pixel position switching signal S22 based on the horizontal differential signal S3. The sampling pixel position switching signal S22 is a signal which repeats such an inversion as 0, 1, 0, 1, ... per line (in other words, in each horizontal period). 14 denotes a first selecting circuit.

FIG. 5 is a block diagram illustrating a concrete constitution of the sampling pixel position switching signal generating circuit 13. In FIG. 5, 24 denotes a counter circuit. 25 denotes a delay circuit to which the horizontal differential signal S3 is inputted as a clock.

An operation of the brightness signal processing apparatus thus constituted is described below.

A count number of all of the pixels in the brightness signal in one horizontal cycle is reset by inputting the horizontal differential signal S3 to the first AND circuit 5 as a reset signal. An output signal S13 of the first AND circuit is inputted to the first delay circuit 6, then, delayed per clock and outputted. The resulting output is inputted to the first counter circuit 4 and counted up therein. Accordingly, a total pixel number count signal S14 is generated by the operations of the first counter circuit 4, first AND circuit 5 and first delay circuit 6. The pixel number count signal S14 shows the count value of all of the pixels in one horizontal cycle. The generated total pixel number count signal S14 is inputted to the horizontal pixel skipping adjusting circuit 7.

The horizontal pixel skipping adjusting circuit 7 generates and outputs a horizontal pixel-skipping signal S15 based on the total pixel number count signal S14. The horizontal pixel-skipping signal S15 is a signal for skipping total pixel data of the brightness signal in one horizontal period per, for example, eight pixels. When the total pixel data is skipped per the eight pixels, for example, the horizontal pixel skipping signal S15 is "1" per at every eight pixels and "0" in the other pixels. S16 denotes the bit shift signal that is bit-shifted by number of pixel skipping bits and is outputted from the horizontal pixel skipping adjusting circuit 7. In the horizontal pixel skipping adjusting circuit 7, the interval at which the pixels are skipped can be adjusted.

The total pixel number count signal S14 outputted from the first delay circuit 6 shows the summed number of all of the pixels in one horizontal period, and the total number of the pixels in one horizontal period, that is, a count value of the total pixel number count signal S14 increases as a broadcast format becomes a higher definition. Therefore, bit numbers of the first counter circuit 4, first AND circuit 5 and first delay circuit 6 have to be added up as the total number of the pixels in one horizontal period is larger.

However, the horizontal pixel skipping adjusting circuit 7 according to the preferred embodiment 7 can reduce the bit number of the bit shift number S16 in accordance with the number of the pixel skipping bits. In the case of skipping per eight pixels, for example, the bit shift signal S16 is 3-bit shifted. As the pixels are more frequently skipped, therefore, the bit number of the bit shift signal S16 can be further reduced. As the more pixels are skipped, the bit numbers of the first comparing circuit 8 and the second comparing circuit 9 can be further reduced.

The bit shift signal S16 which is bit-shifted in the horizontal pixel skipping adjusting circuit 7 and the horizontal period starting-point signal S5 are inputted to the first comparing circuit 8. The first comparing circuit 8 detects coincidence between the bit shift signal S16 and the horizontal period starting-point signal S5 to thereby generate and output a coincidence detection signal S17.

The bit shift signal S16 outputted from the horizontal pixel skipping adjusting circuit 7 and the horizontal period ending-point signal S6 are inputted to the second comparing circuit 9. The second comparing circuit 9 detects coincidence between the bit shift signal S16 and the horizontal period ending-point signal S6 to thereby generate and output a coincidence detection signal S18.

The coincidence detection signals S17 and S18 are inputted to the first set/reset circuit 10. The first set/reset circuit 10 generates a horizontal sampling effective period signal S19 in one horizontal cycle from these coincidence detection signals S17 and S18 and outputs the generated signal. The horizontal pixel skipping signal S15 and the horizontal sampling effective period signal S19 are inputted to the third AND circuit 11. The third AND circuit 11 generates a horizontal pixel skipping sampling signal S20 during the effective period in one horizontal cycle from the horizontal pixel skipping signal S15 and the horizontal sampling effective period signal S19 and outputs the generated signal to the first and second selecting circuits 14 and 12. The second delay circuit 12 delays the horizontal pixel skipping sampling signal S20 by N pixels (N is a natural number equal to or more than 1) to there by generate a delayed horizontal pixel skipping sampling signal S21 and outputs the generated signal to the first selecting circuit 14.

The horizontal differential signal S3 is inputted to the sampling pixel position switching signal generation circuit 13. The sampling pixel position switchover signal generation circuit 13 generates a sampling pixel position switchover signal S22 from the horizontal differential signal S3 and outputs the generated signal to the first selecting circuit 14. The sampling pixel position switchover signal S22 is a signal that repeats such an inversion as 0, 1, 0, 1, . . . in one horizontal cycle. The first selecting circuit 14 generates and outputs the sample window signal S9 that shifts the horizontal sampling pixel positions in each horizontal period by controlling selecting operation thereof based on the sampling pixel position switching signal S22 supplied from the sampling pixel position switching signal generating circuit 13.

Figure 6A:
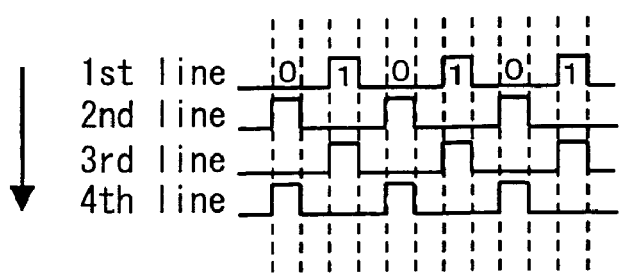
FIG. 6A is a first drawing showing a state of a sample window signal according to the preferred embodiment 1.

FIG. 6A shows a state of the sample window signal S9 in each horizontal period according to the preferred embodiment 1. In the drawing, higher-order signals show higher-order lines on the screen. The pixel is sampled at "1" level, while the pixel is not sampled at "0" level. In the first line, the inversion of 0, 1, 0, 1, . . . is repeated from a starting point. In the second line, the inversion of 1, 0, 1, 0, . . . is repeated from the starting point. In the third line, the inversion of 0, 1, 0, 1, . . . is repeated from the starting point in a manner similar to the first line. In the fourth line, the inversion of 1, 0, 1, 0, . . . is repeated from the starting point in a manner similar to the second line.

Figure 6B:
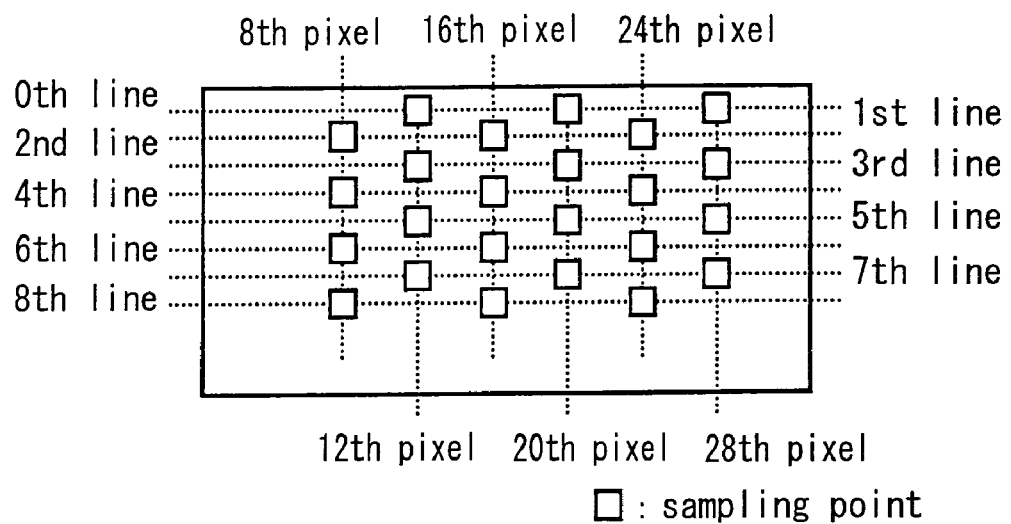
FIG. 6B is a second drawing showing the state of the sample window signal according to the preferred embodiment 1.

FIG. 6B shows sampling positions (square marks) on the screen by the sample window signal S9 shown in FIG. 6A. The pixels are sampled at every eight pixels in the horizontal direction, while the pixels are sampled in each line in the vertical direction. However, the sampling pixel positions are shifted in the horizontal direction by four pixels in each line. The horizontal pixel skipping adjusting circuit 7 can adjust the skipping pixel interval.

According to the present preferred embodiment, the sampling positions can be arbitrarily and equally designated in the vertical direction on the screen.

Preferred Embodiment 2

FIG. 7 is a block diagram illustrating a constitution of the sample window circuit 2 shown in FIG. 1 according to a preferred embodiment 2 of the present invention. In FIG. 7, the point where the constitution is different from that of FIG. 4 according to the preferred embodiment 1 is that additional circuit configurations are provided. The added circuit configurations are described below.

15 denotes a second counter circuit for counting a total number of lines in one vertical period. 16 denotes a third AND circuit for executing an AND processing between the vertical differential signal S4 and a count signal S24. 17 denotes a load hold circuit for load-holding an output signal S25 of the third AND circuit 16 using the horizontal differential signal S3. 18 denotes a vertical pixel skipping adjusting circuit for skipping lines to be sampled from all of the lines in one vertical period. The vertical pixel skipping adjusting circuit 18 can adjust an interval at which the lines are skipped. 19 denotes a third comparing circuit for comparing a bit-shifted signal S28 and the vertical period starting-point signal S7. 20 denotes a fourth comparing circuit for comparing the bit shift signal S28 and the vertical period ending-point signal S8. The bit-shifted signal S28 is supplied from the vertical pixel skipping adjusting circuit 18.

21 denotes a second set/reset circuit for setting an output of the third comparing circuit 19 and an output of the fourth comparing circuit 20 in the sampling effective period. 22 denotes a fourth AND circuit for executing an AND processing between a vertical sampling effective period signal S31 outputted from the second set/reset circuit 21 and a vertical pixel skipping signal S27 outputted from the vertical pixel skipping adjusting circuit 18.

26 denotes a sampling pixel position switching signal generating circuit for generating a sampling pixel position switching signal S33. The sampling pixel position switching signal S33 repeats such an inversion as 0, 1, 0, 1, . . . per the lines to be skipped. The sampling pixel position switching signal generating circuit 26 generates the sampling pixel position switching signal S33 based on an output signal S32 of the fourth AND circuit 22.

23 denotes a fifth AND circuit for executing an AND processing between an output signal S23 of the first selecting circuit and the output signal S32 of the fourth AND circuit 22. An output signal of the fifth AND circuit 23 becomes the sample window signal S9. Because the rest of the constitution is the same as that of the preferred embodiment 1, the constitution and the operations are not described again.

In FIG. 7, the vertical differential signal S4 is inputted to the third AND circuit 16 as a reset signal so that a count number of all of the lines in one vertical period is reset. The output signal S25 of the third AND circuit 16 is inputted to the load hold circuit 17. The load hold circuit 17 load-holds the output signal S25 using the horizontal differential signal S3 so as to thereby delay the output signal S25 in each horizontal period and output the delayed signal to the second counter circuit 15. The second counter circuit 15 counts up the inputted delayed output signal S25. By doing so, a total line number count signal S26 is generated by the operations of the second counter circuit 15, third AND circuit 16 and load hold circuit 17. The total line number count signal S26 shows the count value of all of the lines in one vertical period. The generated total line number count signal S26 is inputted to the vertical pixel skipping adjusting circuit 18.

In the vertical pixel skipping adjusting circuit 18, the vertical pixel-skipping signal S27 is generated based on the total line number count signal S26 and outputted. The vertical pixel-skipping signal S27 is a signal for skipping the total number of the lines in one vertical period by, for example, every four lines. S28 is a bit shift signal which is bit-shifted by the pixel skipping bit number and outputted from the vertical pixel skipping adjusting circuit 18. The vertical pixel skipping adjusting circuit 18 can adjust the line-skipping interval.

The bit shift signal S28 which is bit-shifted in the vertical pixel skipping adjusting circuit 18 and the vertical period starting-point signal S7 are inputted to the third comparing circuit 19. The third comparing circuit 19 detects coincidence between the bit shift signal S28 and the vertical period starting-point signal S7 to thereby generate and output a coincidence detection signal S29.

The bit shift signal S28 outputted from the vertical pixel skipping adjusting circuit 18 and the vertical period ending-point signal S8 are inputted to the fourth comparing circuit 20. The fourth comparing circuit 20 detects coincidence between the bit shift signal S28 and the vertical period ending-point signal S8 to thereby generate and output a coincidence detection signal S30.

The coincidence detection signals S29 and S30 are inputted to the second set/reset circuit 21. The second set/reset circuit 21 generates a vertical sampling effective period signal S31 in one vertical period from these coincidence detection signals S29 and S30 and outputs the generated signal. The vertical pixel skipping signal S27 and the vertical sampling effective period signal S31 are inputted to the fourth AND circuit 22. The fourth AND circuit 22 generates a vertical pixel skipping sampling signal S32 during the effective period in one vertical period from the vertical pixel skipping signal S27 and the vertical sampling effective period signal S31 and outputs the generated signal to the sampling pixel position switching signal generating circuit 26 and the fifth AND circuit 23.

The sampling pixel position switching signal generating circuit 26 generates a sampling pixel position switching signal S33 which repeats such an inversion as 0, 1, 0, 1, . . . in each pixel skipping vertical period based on the vertical pixel skipping sampling signal S32 and outputs the generated signal to the first selecting circuit 14. The first selecting circuit 14 generates and outputs the horizontal pixel skipping sampling signal S23 where the sampling pixel position is shifted in the horizontal direction in each horizontal cycle. The selecting operation of the first selecting circuit 14 is controlled by the sampling pixel position switching signal S33 supplied from the sampling pixel position switching signal generating circuit 26.

The output of the first selecting circuit 14 (horizontal pixel skipping sampling signal S23) and the output of the fourth AND circuit (vertical pixel skipping sampling signal S32) are inputted to the fifth AND circuit 23. The fifth AND circuit 23 generates and outputs the sample window signal S9 where the sampling pixel position is shifted in the horizontal direction in each pixel skipping vertical cycle based on the supplied horizontal pixel skipping sampling signal S23 and vertical pixel skipping sampling signal S32.

Figure 8A:
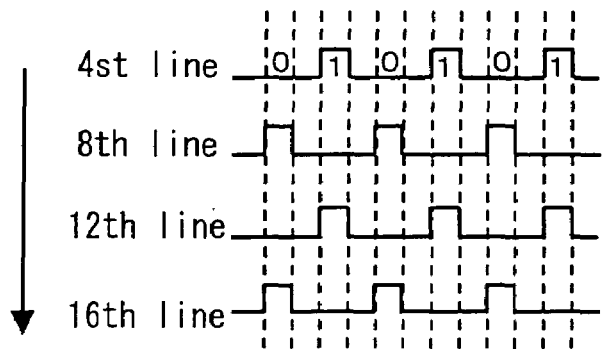
FIG. 8A is a first drawing showing a state of a sample window signal according to the preferred embodiment 2.

FIG. 8A shows a state of the sample window signal S9 in each horizontal cycle according to the preferred embodiment 2. In the fourth line, the inversion of 0, 1, 0, 1, . . . is repeated from the starting point. In the eighth line, the inversion of 1, 0, 1, 0, . . . is repeated from the starting point. In the 12th line, the inversion of 0, 1, 0, 1, . . . is repeated from the starting point in a manner similar to the fourth line. In the 16th line, the inversion of 1, 0, 1, 0, . . . is repeated from the starting point in a manner similar to the eighth line.

Figure 8B:
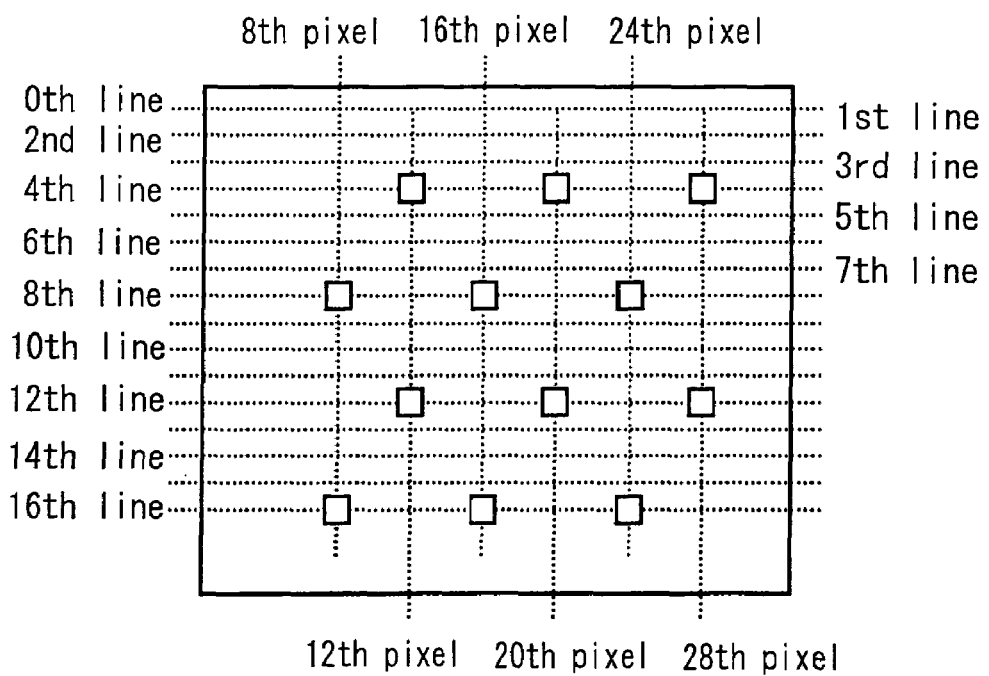
FIG. 8B is a second drawing showing the state of the sample window signal according to the preferred embodiment 2.

FIG. 8B shows sampling positions on the screen by the sample window signal S9 shown in FIG. 8A. The pixels are sampled by every eight pixels in the horizontal direction, while sampling by every four lines in the vertical direction. The sampling pixel positions are shifted in the horizontal direction by four pixels. In other words, the sampling pixel positions are shifted in the horizontal direction by four lines. The horizontal pixel skipping adjusting circuit 7 adjusts the skipping pixel interval. The vertical pixel skipping adjusting circuit 18 adjusts the skipping line interval.

According to the present preferred embodiment, the sampling positions can be arbitrarily and equally designated in the vertical, horizontal and oblique directions on the screen.

Preferred Embodiment 3

FIG. 9 is a block diagram illustrating a constitution according to a preferred embodiment 3 of the present invention of the sample window circuit 2 shown in FIG. 1. The constitution shown FIG. 9 is different from that of the preferred embodiment 2 (FIG. 7) in the point that some of circuit configurations are additionally provided. The added circuit configurations are described below.

27 denotes an inversion circuit for generating an inversion sampling pixel position switching signal S34 by inverting the sampling pixel position switching signal S33 outputted from the sampling pixel position switching signal generating circuit 26. 29 denotes a field switching signal generating circuit for generating a field switching signal S35. The field switching signal generating circuit 29 generates the field switching signal S35 based on the vertical differential signal S4. The field switching signal S35 repeats such an inversion as 0, 1, 0, 1, . . . in each vertical cycle based on the vertical differential signal S4. 28 denotes a second selecting circuit. The second selecting circuit 28 selects the sampling pixel position switching signal S33 and the inversion sampling pixel position switching signal S34 based on the field switching signal S35 supplied from the field switching signal generating circuit 29 and outputs the selected signals to the first selecting circuit 14. Because the rest of the constitution is the same as that of the preferred embodiment 2 shows in FIG. 7, the constitution and the operations are not described again.

Operations that is characteristic of the present preferred embodiment are described below. The sampling pixel position switching signal S33 outputted from the sampling pixel position switching signal generating circuit 26 and the inversion sampling pixel position switching signal S34 outputted from the inversion circuit 27 are inputted to the second selecting circuit 28. The vertical differential signal S4 is inputted to the field switching signal generating circuit 29. The field switching signal generating circuit 29 generates the field switching signal S35 which repeats such the inversion of 0, 1, 0, 1, . . . in each vertical cycle based on the vertical differential signal S4 and outputs the generated signal to the second selecting circuit 28. The second selecting circuit 28 selects one from the sampling pixel position switching signal S33 and the inversion sampling pixel position switching signal S34 based on the supplied field switching signal S35. The second selecting circuit 28 outputs the selected signal (S33 or S34) to the first selecting circuit 14 as an ultimate sampling pixel position switching signal S36.

FIG. 10A shows a specific constitution of the field switching signal generating circuit 29. 30 denotes a counter circuit. 31 denotes a delay circuit to which the vertical differential signal S4 is inputted as a clock. The field switching signal S35 repeats the inversion of 0, 1, 0, 1, . . . in each vertical cycle as shown in FIG. 10B.

FIGS. 11A-11D show states of the sample window signal S9 according to the present preferred embodiment.

Figure 11A:
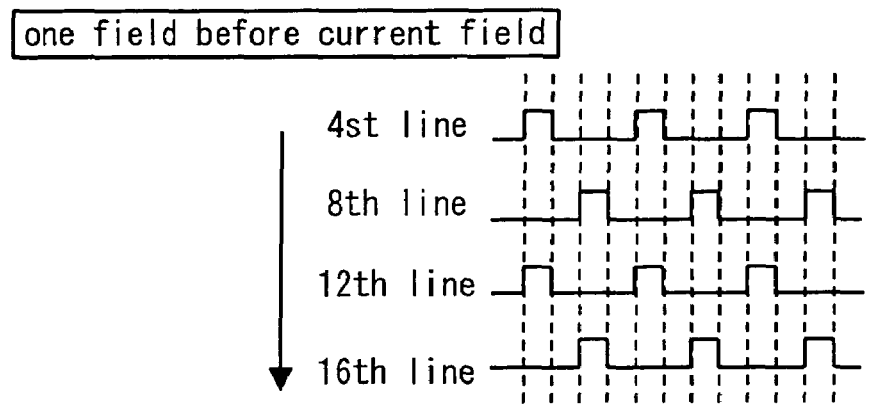
FIG. 11A is a first drawing showing a state of a sample window signal according to the preferred embodiment 3.

In FIG. 11A, the state of the sample window signal in each pixel skipping horizontal cycle in the last field is shown. In the fourth line, the inversion of 1, 0, 1, 0, . . . is repeated from the starting point. In the eighth line, the inversion of 0, 1, 0, 1, . . . is repeated from the starting point. In the 12th line, the inversion of 1, 0, 1, 0, . . . is repeated from the starting point in a manner similar to the fourth line. In the 16th line, the inversion of 0, 1, 0, 1, . . . is repeated from the starting point in a manner similar to the eighth line.

Figure 11B:
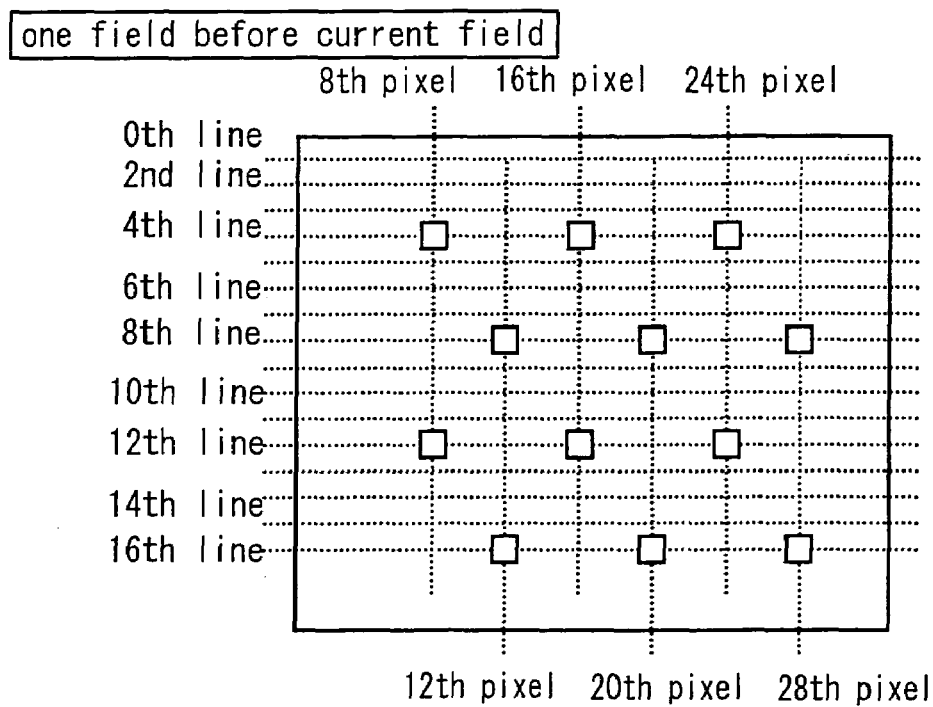
FIG. 11B is a second drawing showing the state of the sample window signal according to the preferred embodiment 3.

FIG. 11B shows sampling positions on the screen by the sample window signal S9 shown in FIG. 11A. The pixels are sampled by every eight pixels in the horizontal direction, while sampling by every four lines in the vertical direction. The sampling pixel positions are shifted in the horizontal direction by four pixels. In other words, the sampling pixel positions are shifted in the horizontal direction by four lines. More specifically, the pixels are sampled in the eighth pixel, 16th pixel and 24th pixel in the fourth line, the pixels are sampled in the 12th pixel, 20th pixel and 28th pixel in the eighth line, the pixels are sampled in the eighth pixel, 16th pixel and 24th pixel in the 12th line in a manner similar to the fourth line, and the pixels are sampled in the 12th pixel, 20th pixel and 28th pixel in the 16th line in a manner similar to the eighth line.

Figure 11C:
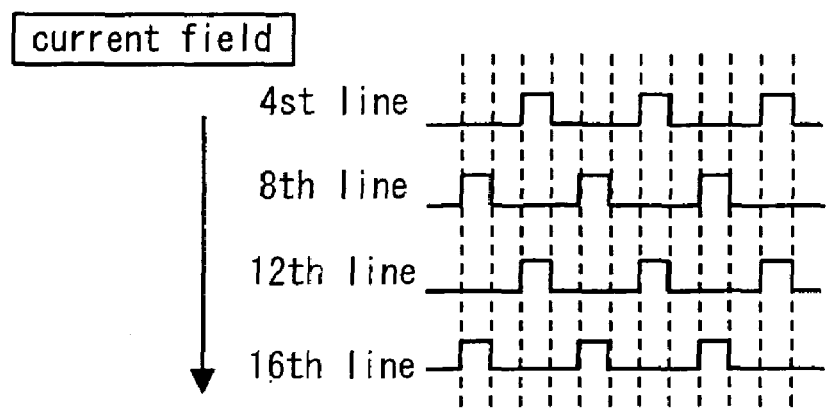
FIG. 11C is a third drawing showing the state of the sample window signal according to the preferred embodiment 3.

FIG. 11C shows the state of the sample window signal S9 shown in FIG. 11A in each horizontal cycle in one field after the current field. In the fourth line, the inversion of 0, 1, 0, 1, . . . is repeated from the starting point. In the eighth line, the inversion of 1, 0, 1, 0, . . . is repeated from the starting point. In the 12th line, the inversion of 0, 1, 0, 1, . . . is repeated from the starting point in a manner similar to the fourth line. In the 16th line, the inversion of 1, 0, 1, 0, . . . is repeated from the starting point in a manner similar to the eighth line.

Figure 11D:
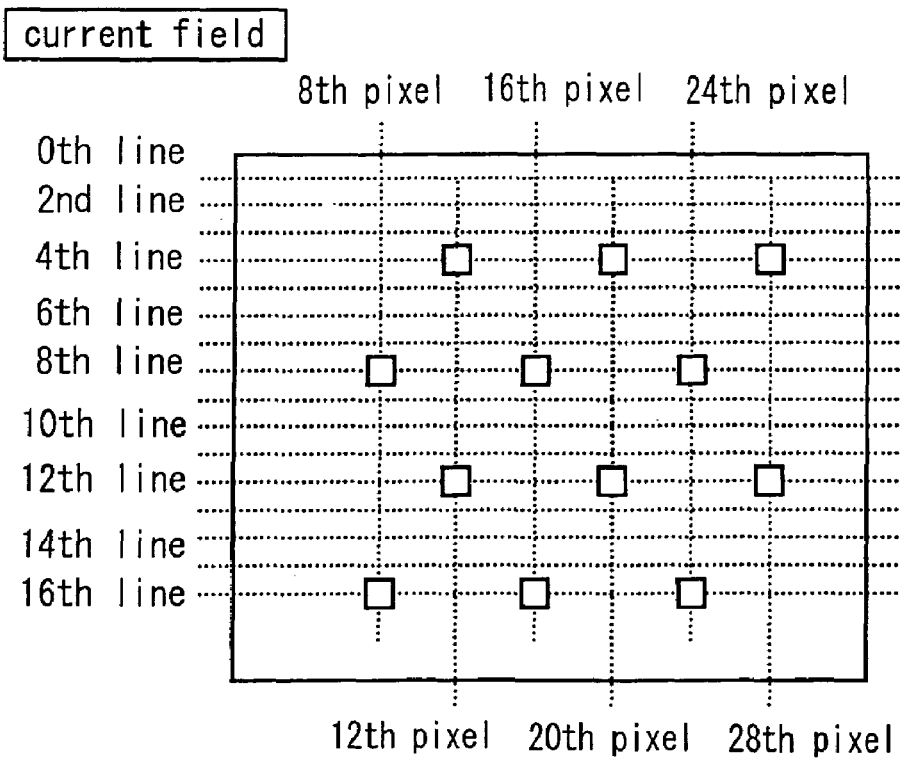
FIG. 11D is a fourth drawing showing the state of the sample window signal according to the preferred embodiment 3.

FIG. 11D shows sampling positions on the screen by the sample window signal S9 shown in FIG. 11C. The sampling pixel positions are shifted by four pixels in the horizontal direction in comparison to the sampling pixel positions shown in FIG. 11B. More specifically, the pixels are sampled in the 12th pixel, 20th pixel and 28th pixel in the fourth line, the pixels are sampled in the eighth pixel, 16th pixel and 24th pixel in the eighth line, the pixels are sampled in the 12th pixel, 20th pixel and 28th pixel in a manner similar to the fourth line, and the pixels are sampled in the eighth pixel, 16th pixel and 24th pixel in the 16th line in a manner similar to the eighth line.

According to the present preferred embodiment, the sampling positions can be arbitrarily and equally designated in the vertical, horizontal and oblique directions on the screen. Therefore, the sampling pixel positions can be shifted per field, which further improves the arbitrariness and equality in the sampling position setting.

Preferred Embodiment 4

Figure 12:
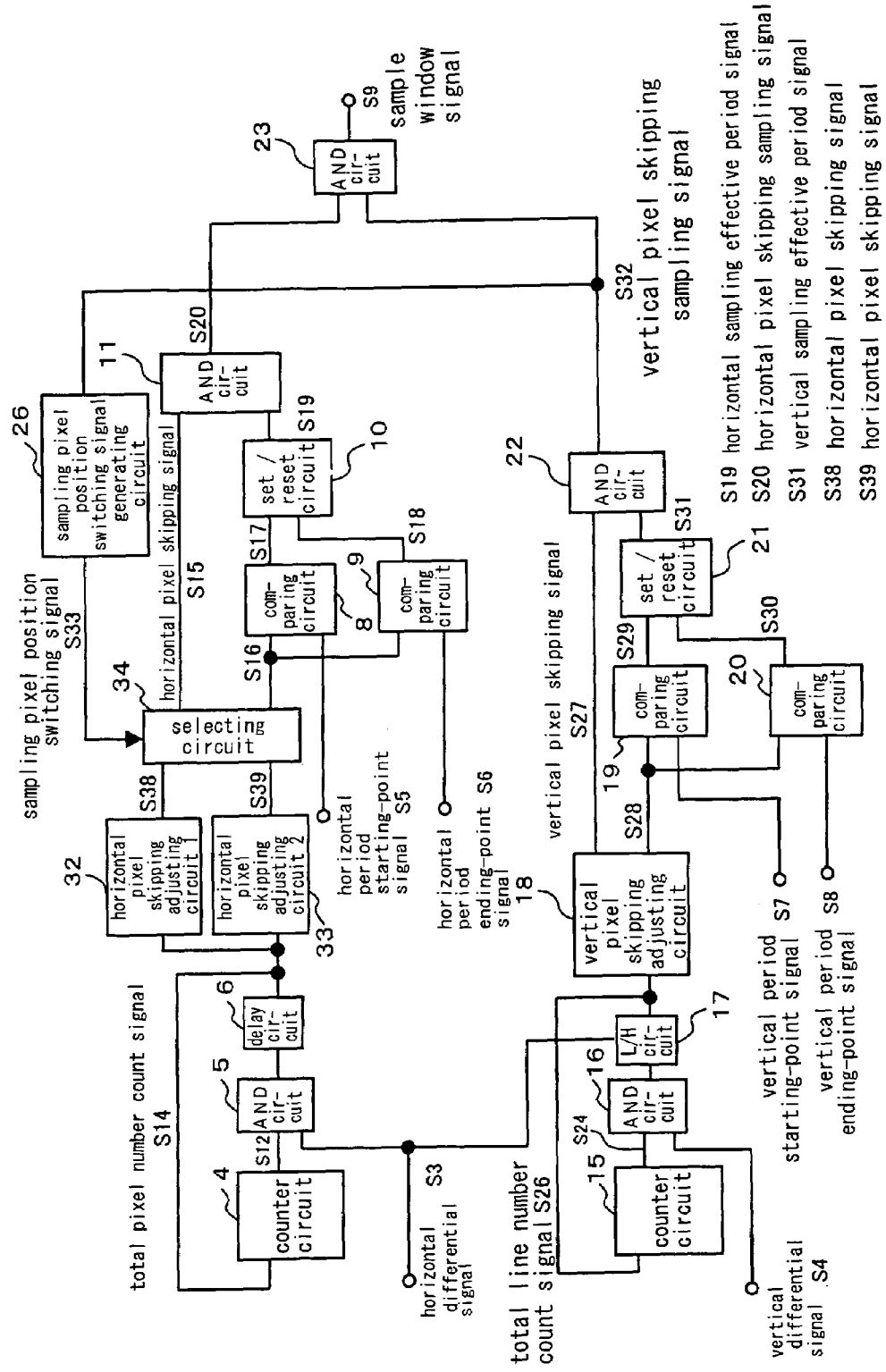
FIG. 12 is a block diagram illustrating a constitution of a sample window circuit according to a preferred embodiment 4 of the present invention.

FIG. 12 is a block diagram illustrating a constitution according to a preferred embodiment 4 of the present invention in the sample window circuit 2 shown in FIG. 1. The constitution shown FIG. 12 is different from that of FIG. 7 according to the preferred embodiment 2 in the point that some of circuit configurations are additionally provided. The added circuit configurations are described below.

32 denotes a first horizontal pixel skipping adjusting circuit for skipping pixel data of the brightness signal in one horizontal period according to a first pixel skipping method (for example, skipping by every eight pixels). The first horizontal pixel skipping adjusting circuit 32 can adjust the skipping pixel interval. 33 denotes a second horizontal pixel skipping adjusting circuit for skipping the pixel data of the brightness signal in one horizontal period according to a second pixel skipping method (for example, skipping by every four pixels). The second horizontal pixel skipping adjusting circuit 33 can adjust the skipping pixel interval. 34 denotes a selecting circuit for selecting one from a horizontal pixel skipping signal S38 of the first horizontal pixel skipping adjusting circuit 32 and a horizontal pixel skipping signal S39 of the second horizontal pixel skipping adjusting circuit 33. The selecting circuit 34 is controlled by the sampling pixel position switching signal S33 of the sampling pixel position switching signal generating circuit 26. In the present preferred embodiment, the second delay circuit 12 and the selecting circuit 14 according to the preferred embodiment 2 (FIG. 7) are omitted. The output of the second AND circuit 11 is directly inputted to the fifth AND circuit 23. Because the rest of the constitution is the same as that of the preferred embodiment 2 (FIG. 7), the constitution and the operations are not described again.

The operations that are characteristic of the present preferred embodiment are described below. The total pixel number count signal S14 in one horizontal cycle outputted by the first delay circuit 6 is inputted to the first horizontal pixel skipping adjusting circuit 32 and the second horizontal pixel skipping adjusting circuit 33. The first horizontal pixel skipping adjusting circuit 32 skips total pixel data of the brightness signal in one horizontal period according to the first pixel skipping method (for example, skipping by every eight pixels) to thereby generate and output the horizontal pixel skipping signal S38. The second horizontal pixel skipping adjusting circuit 33 skips the total pixel data of the brightness signal in one horizontal period according to the second pixel skipping method (for example, skipping by every four pixels) to thereby generate and output the horizontal pixel skipping signal S39. The selecting circuit 34 selects and outputs either of the horizontal pixel skipping signal S38 and the horizontal pixel skipping signal S39 based on the sampling pixel position switching signal S33.

Figure 13A:
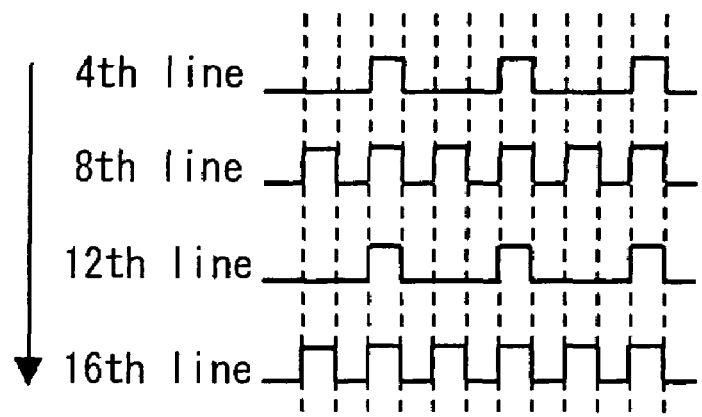
FIG. 13A is a first drawing showing a state of a sample window signal according to the preferred embodiment 4.
Figure 13B:
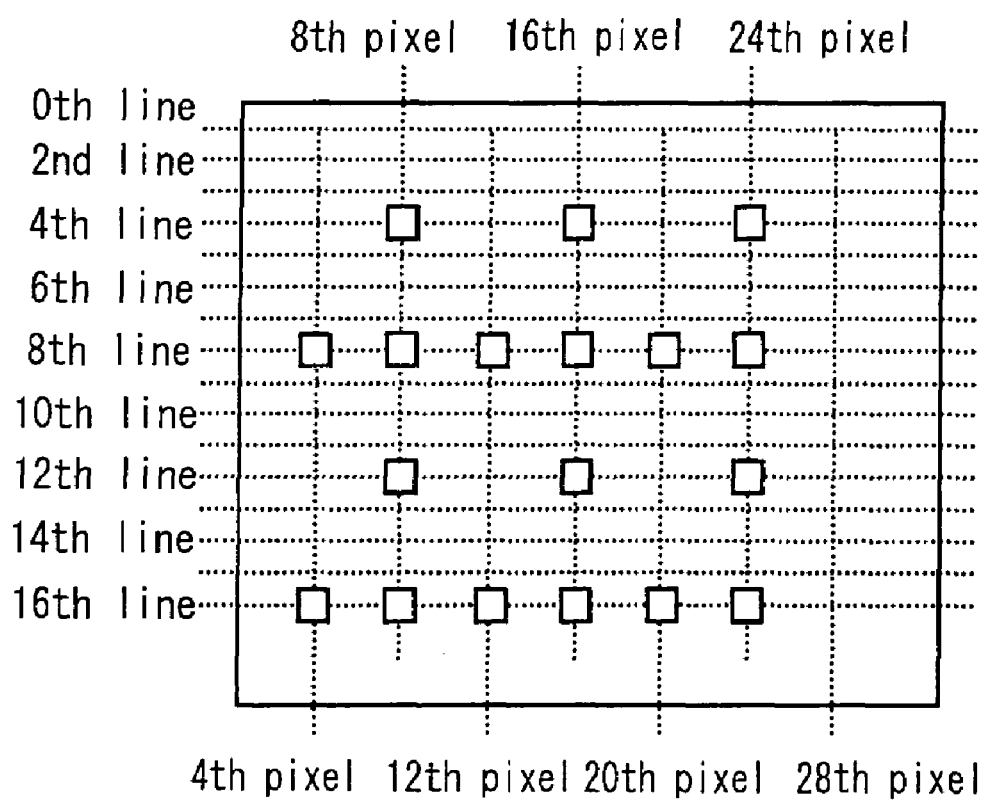
FIG. 13B is a second drawing showing the state of the sample window signal according to the preferred embodiment 4.

FIG. 13A shows a state of the sample window signal S9 in each horizontal cycle according to the preferred embodiment 4. In the fourth line, the inversion of 0, 1, 0, 1, . . . is repeated from the starting point. In the eighth line, the inversion of 1, 0, 1, 0, . . . is repeated from the starting point. The sampling in the fourth line is per eight pixels, and the sampling in the eighth line is per four pixels, wherein the sampling number is doubled and the sampling points in the horizontal direction are added up. In the 12th line, the inversion of 0, 1, 0, 1, . . . is repeated from the starting point in a manner similar to the fourth line. In the 16th line, the inversion of 1, 0, 1, 0, . . . is repeated from the starting point in a manner similar to the eighth line. The sampling in the 12th line is per eight pixels, and the sampling in the 16th line is per four pixels, wherein the sampling number is doubled and the sampling points in the horizontal direction are added up.

According to the present preferred embodiment, the sampling positions can be arbitrarily and equally designated in the vertical, horizontal and oblique directions on the screen. Further, the sampling pixel number is variable, which further improves the arbitrariness and equality in the sampling position setting.

Preferred Embodiment 5

Figure 14:
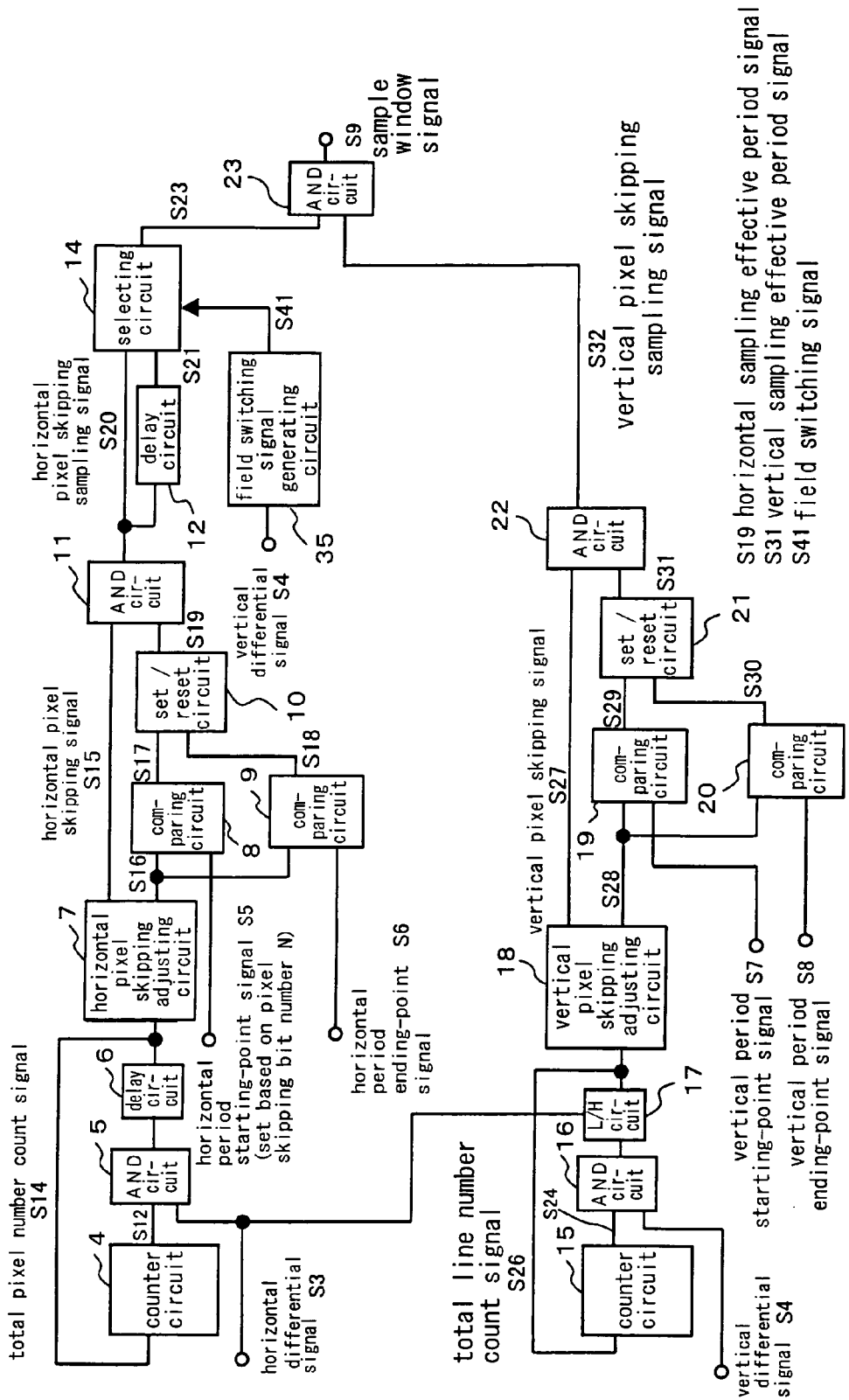
FIG. 14 is a block diagram illustrating a constitution of a sample window circuit according to a preferred embodiment 5 of the present invention.

FIG. 14 is a block diagram illustrating a constitution according to a preferred embodiment 5 of the present invention in the sample window circuit 2 shown in FIG. 1. The constitution shown FIG. 14 is different from that of the preferred embodiment 2 (FIG. 7) in the point that some of circuit configurations are additionally provided. The added circuit configurations are described below.

35 denotes a field switching signal generating circuit for generating a field switching signal S41 and outputting the generated signal to the first selecting circuit 14. The field switching signal generating circuit 35 generates the field switching signal S41 based on the vertical differential signal S4. The field switching signal S41 is a signal for switching the sampling pixel position in the horizontal direction in each vertical period.

The output of the fourth AND circuit 22 is inputted to the fifth AND circuit 23, however, not inputted to the field switching signal generating circuit 35. Because the rest of the constitution is the same as that of the preferred embodiment 2 (FIG. 7), the constitution and the operations are not described again.

In the constitution according to the present preferred embodiment, the field switching signal S41 capable of switching the sampling pixel position in the horizontal direction in each vertical period is used to control the switching operation of the first selecting circuit 14.

FIGS. 15A-15D show states of the sample window signal S9 according to the present preferred embodiment.

In FIG. 15A, the state of the sample window signal S9 in each pixel skipping horizontal cycle in the last field is shown. The sample window signal S9 repeats the inversion of 0, 1, 0, 1, . . . in the fourth, eighth, 12th, and 16th lines from the respective starting points.

FIG. 15B show sampling positions on the screen by the sample window signal S9 shown in FIG. 15A. The sampling is carried out at the eighth, 16th and 24th pixel in the fourth, eighth, 12th and 16th lines.

FIG. 15c shows the state of the sample window signal S9 shown in FIG. 15A in each pixel skipping horizontal cycle in one field after the current field. In FIG. 15C, the sampling pixel positions are shifted by four pixels in the horizontal direction in comparison to FIG. 15A. More specifically, the sampling carried out at the 12th, 20th and 28th pixel at the fourth, eighth, 12th and 16th lines respectively.

According to the present preferred embodiment, the sampling positions can be arbitrarily designated in the horizontal direction on the screen. Further, the sampling pixel positions are shifted per field, which further improves the arbitrariness and equality in the sampling position setting.

Preferred Embodiment 6

FIG. 16 is a block diagram illustrating a constitution according to a preferred embodiment 6 of the present invention of the sample window circuit 2 shown in FIG. 1. The constitution shown FIG. 16 is different from that of the preferred embodiment 2 (FIG. 7) in the point that some of circuit configurations are additionally provided. The added circuit configurations are described below.

36 denotes a field switching signal generating circuit for generating a field switching signal S44 and outputting the generated signal to a selecting circuit 39. The field switching signal generating circuit 36 generates the field switching signal S44 based on the vertical differential signal S4. The field switching signal S44 is a signal for switching a sampling line position in the vertical direction in each vertical period.

37 denotes a first vertical pixel skipping adjusting circuit for skipping sampling lines in one vertical period according to a first pixel skipping method (for example, skipping by every four lines). 38 denotes a second vertical pixel skipping adjusting circuit for skipping the sampling lines in one vertical period according to a second pixel skipping method (for example, skipping by every two lines). 39 denotes a selecting circuit for selecting either of a vertical pixel skipping signal S42 of the first vertical pixel skipping adjusting circuit 37 and a vertical pixel skipping signal S43 of the second vertical pixel skipping adjusting circuit 38. The selecting circuit 39 outputs the selected signal as a vertical pixel skipping signal S45 to the fourth AND circuit 22. The selecting operation of the selecting circuit 39 is controlled based on the field switching signal S44. Because the rest of the constitution is the same as that of the preferred embodiment 2 (FIG. 7), the constitution and the operations are not described again.

The operations that become characteristic of the present preferred embodiment are described below. The output signal of the load hold circuit 17 is inputted to the first and second vertical pixel skipping adjusting circuits 37 and 38. The first and second vertical pixel skipping adjusting circuits 37 and 38 skip the output signal of the load hold circuit 17 according to the respective pixel skipping methods to thereby generate the vertical pixel skipping signals S42 and S43 and output the generated signals to the selecting circuit 39.

The selecting circuit 39 selects (switches) either of the vertical pixel skipping signals S42 and S43 in each vertical period (one field) based on the field switching signal S44 supplied from the field switching signal generating circuit 36 to thereby switch the sampling line positions in the vertical directions in each vertical period (one field).

FIGS. 17A-17D show states of the sample window signal S9 in the present preferred embodiment.

Figure 17A:
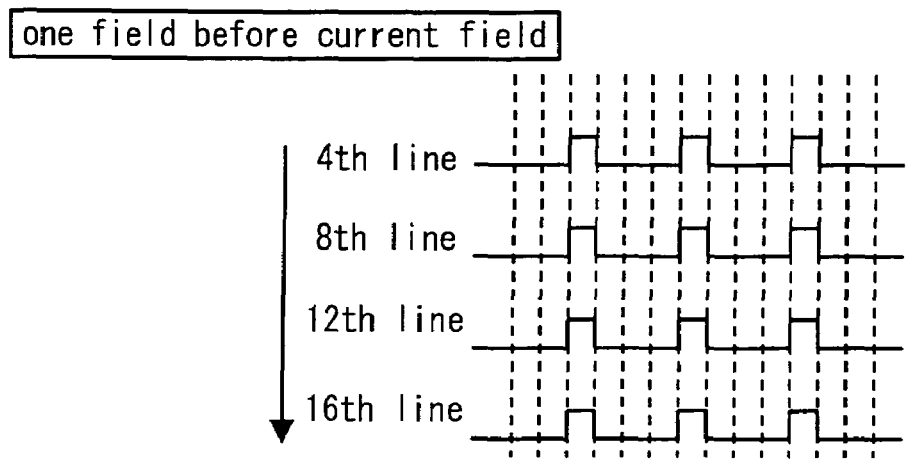
FIG. 17A is a first drawing showing a state of a sample window signal according to the preferred embodiment 6.

FIG. 17A shows the state of the sample window signal S9 in each skipping horizontal cycle in the last field. The sample window signal S9 repeats the inversion of 0, 1, 0, 1, . . . in the fourth, eighth, 12th and 16th lines from the respective starting points.

Figure 17B:
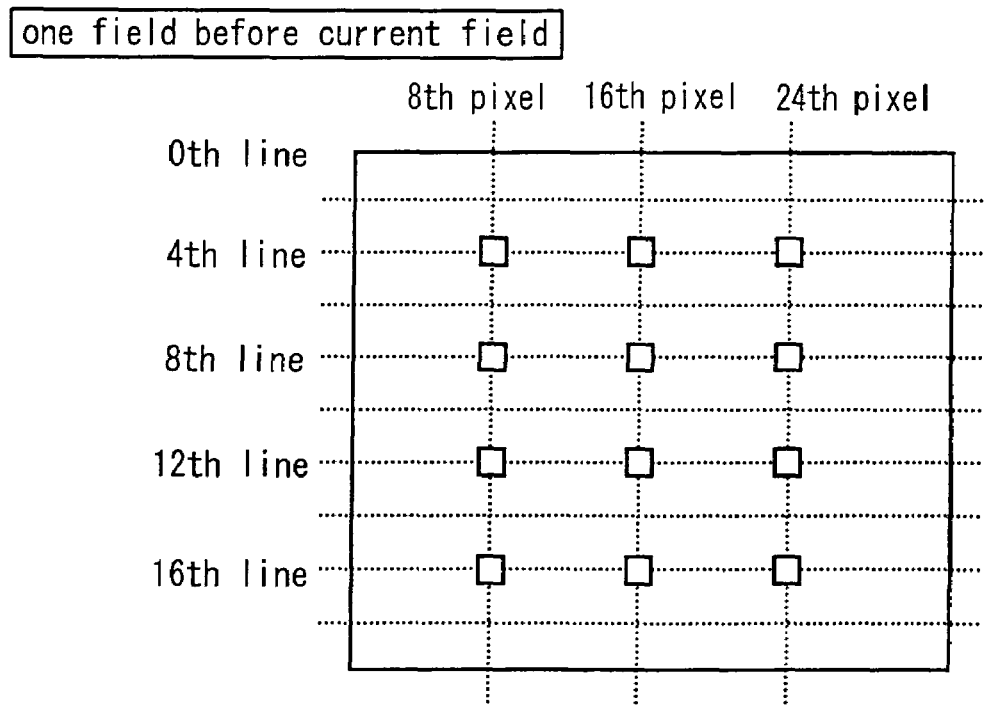
FIG. 17B is a second drawing showing the state of the sample window signal according to the preferred embodiment 6.

FIG. 17B shows sampling positions on the screen by the sample window signal S9 shown in FIG. 17A. The sampling is carried out at the eighth, 16th and 24th pixels at the fourth, eighth, 12th and 16th lines.

Figure 17C:
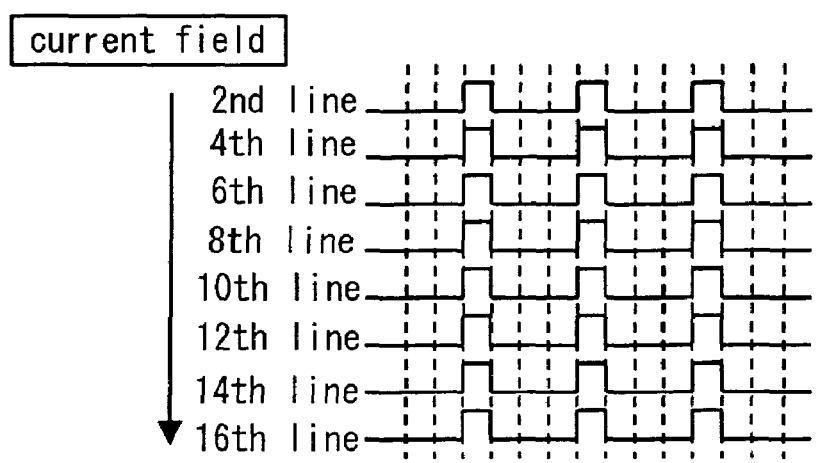
FIG. 17C is a third drawing showing the state of the sample window signal according to the preferred embodiment 6.
Figure 17D:
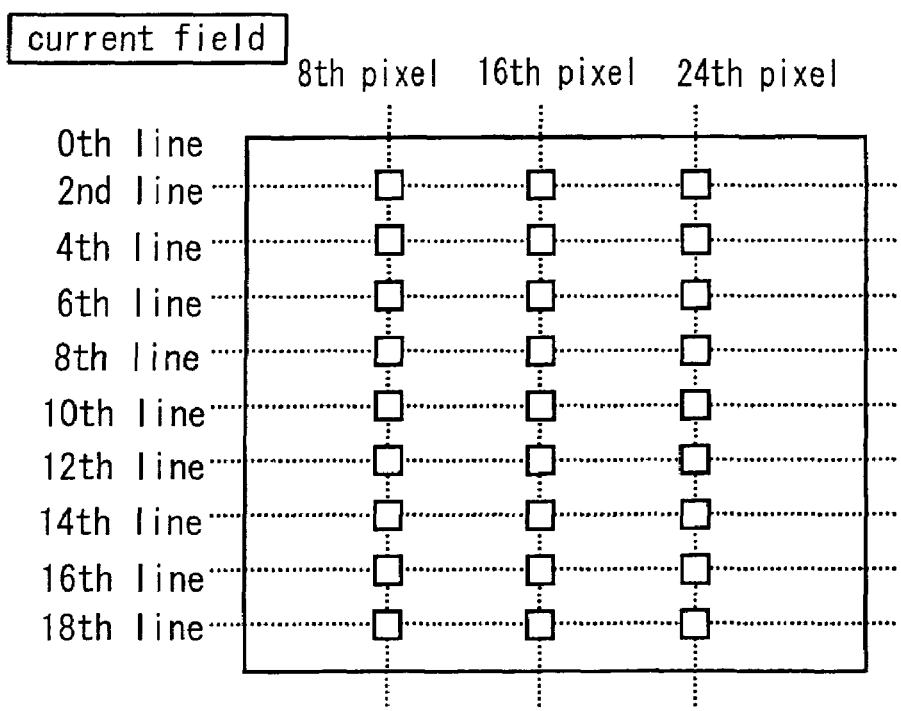
FIG. 17D is a fourth drawing showing the state of the sample window signal according to the preferred embodiment 6.

FIG. 17C shows the state of the sample window signal S9 shown in FIG. 17A in each pixel skipping horizontal cycle in one field after the current field. The selected lines are doubled in the vertical direction in comparison to FIG. 17A. More specifically, the sampling is carried out at the eighth, 16th and 24th pixels at the second, fourth, sixth, eighth, tenth, 12th, 14th and 16th lines respectively.

According to the present preferred embodiment, the sampling positions can be arbitrarily designated in the vertical direction on the screen. Therefore, the number of the sampling lines is variable per field, which further improves the arbitrariness and equality in the sampling position setting.

Furthermore, in the foregoing description, the first and second (37 and 38) vertical pixel skipping adjusting circuits are used, however, at least three vertical pixel skipping adjusting circuits may be provided.

Preferred Embodiment 7

Figure 18:
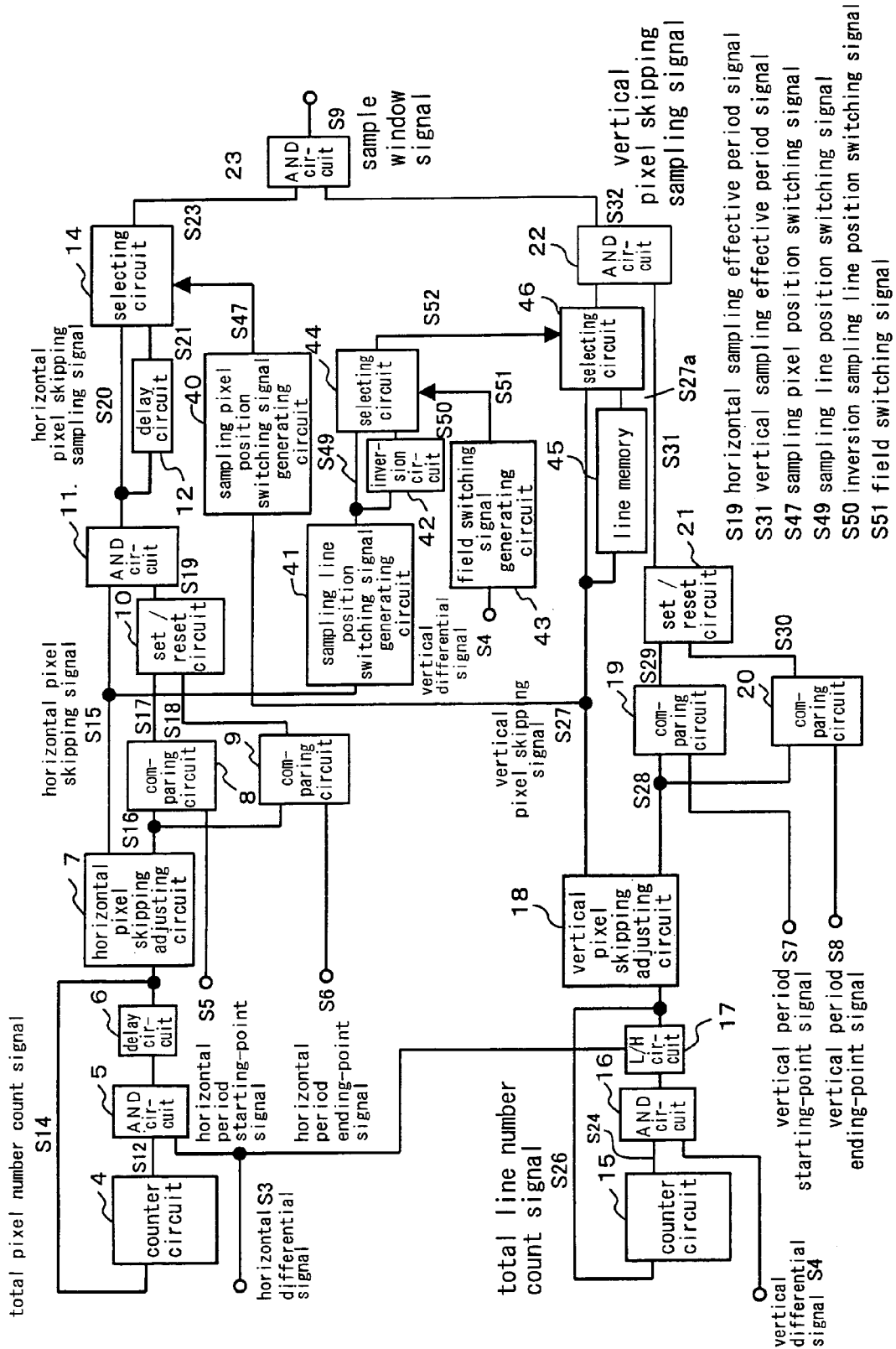
FIG. 18 is a block diagram illustrating a constitution of a sample window circuit according to a preferred embodiment 7 of the present invention.

FIG. 18 is a block diagram illustrating a constitution according to a preferred embodiment 7 of the present invention in the sample window circuit 2 shown in FIG. 1. The constitution shown FIG. 18 is different from that of the preferred embodiment 3 (FIG. 9) in the point that some of circuit configurations are additionally provided. The added circuit configurations are described below.

40 denotes a sampling pixel position switching signal generating circuit for generating a sampling pixel position switching signal S47 and outputting the generated signal to the first selecting circuit 14. The vertical pixel skipping signal S27 is inputted from the vertical pixel skipping adjusting circuit 18 to the sampling pixel position switching signal generating circuit 40. The sampling pixel position switching signal generating circuit 40 generates the sampling pixel position switching signal S47 which repeats the inversion of 0, 1, 0, 1, . . . in each skipping horizontal cycle based on the vertical pixel skipping signal S27.

41 denotes a sampling line position switching signal generating circuit for generating a sampling line position switching signal S49. The output signal of the horizontal pixel skipping adjusting circuit 7 (horizontal pixel skipping signal S15) is inputted to the sampling line position switching signal generating circuit 41. The sampling line position switching signal generating circuit 41 generates the sampling line position switching signal S49 based on the horizontal skipping signal S15. The sampling line position switching signal S49 is a signal for switching the sampling pixel position per the skipping pixels in one horizontal cycle.

42 denotes an inversion circuit for inverting the sampling line position switching signal S49 outputted from the sampling line position switching signal generating circuit 41. 43 denotes a field switching signal generating circuit for generating a field switching signal S51. The field switching signal generating circuit 43 generates the field switching signal S51 based on the vertical differential signal S4. The field switching signal S51 is a signal which repeats the inversion of 0, 1, 0, 1, . . . in each vertical cycle. 44 denotes a third selecting circuit for selecting either of the sampling line position switching signal S49 and an inversion sampling line position switching signal S50 based on the field switching signal S51. 45 denotes a line memory for delaying the vertical pixel skipping signal S27 from the vertical pixel skipping adjusting circuit 18 by one horizontal cycle. 46 denotes a fourth selecting circuit for selecting either of the vertical pixel skipping signal S27 from the vertical pixel skipping adjusting circuit 18 and a delayed vertical pixel skipping signal S27a from the line memory 45. The selecting operation of the fourth selecting circuit 46 is controlled based on an output signal S52 of the third selecting signal. Because the rest of the constitution is the same as that of the preferred embodiment 3 (FIG. 9), the constitution and the operations are not described again.

The operations that is characteristic of the present preferred embodiment are described below. The sampling pixel position switching signal generating circuit 40 switches the sampling pixel position by a predetermined number of skipping lines. The predetermined number of skipping lines is set based on the number of the lines skipped in the vertical direction. The third selecting circuit 44 switches between the sampling line position switching signal S49 and the inversion sampling line position switching signal S50 to thereby output the signal S52 to the fourth selecting circuit 46. The fourth selecting circuit 46 is controlled based on the signal S52. The fourth selecting circuit 46 alternately selects the vertical pixel skipping signal S27 and the vertical pixel skipping signal S27a delayed in the vertical direction and outputs the selected signal to the fourth AND circuit 22. The fourth AND circuit 22 switches the sampling pixel positions in the vertical direction based on the vertical cycle.

FIG. 19 is a timing chart according to the preferred embodiment 7. S47 denotes a sampling pixel position switching signal per the skipping lines. S47 denotes the sampling pixel position switching signal in the horizontal direction. S51 denotes the field switching signal generated in each vertical period. S52 denotes the output signal of the third selecting circuit 44.

FIGS. 20A-20D show states of the sample window signal S9 according to the present preferred embodiment.

Figure 20A:
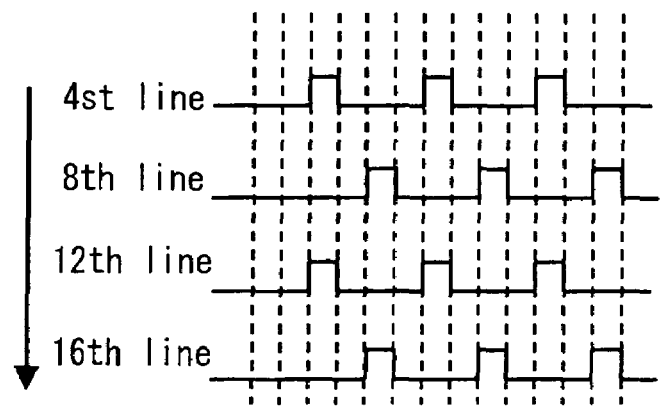
FIG. 20A is a first drawing showing a state of a sample window signal according to the preferred embodiment 7.
Figure 20B:
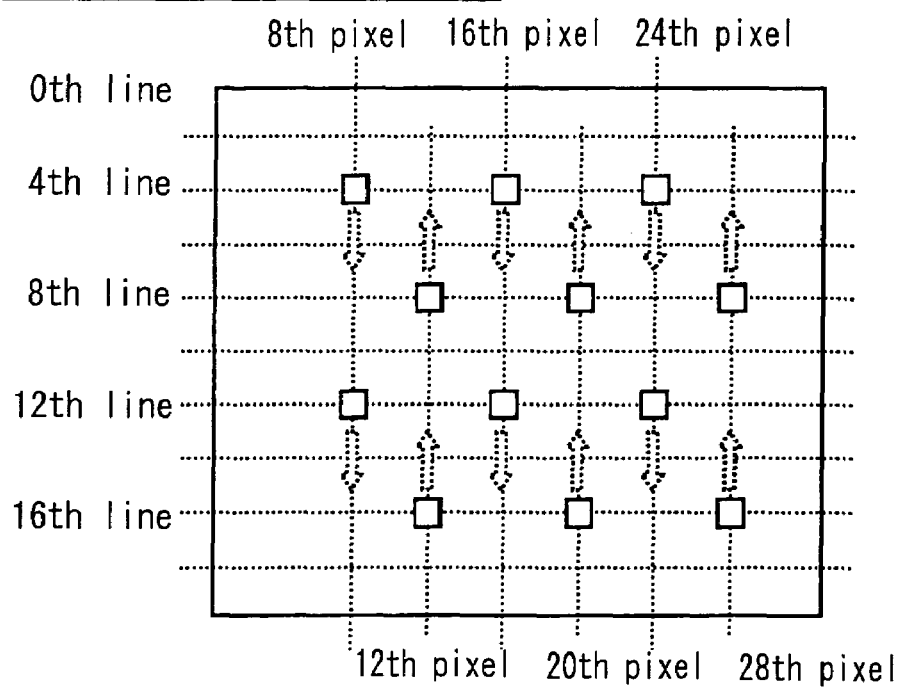
FIG. 20B is a second drawing showing the state of the sample window signal according to the preferred embodiment 7.

FIG. 20A shows the state of the sample window signal S9 per one skipping horizontal cycle in the last field. FIG. 20B shows sampling positions on the screen by the sample window signal S9 shown in FIG. 20A. In the fourth line, the sampling is carried out at the eighth, 16th and 24th pixels. In the eighth line, the sampling is carried out at the 12th, 20th and 28th pixels. In the 12th line, the sampling is carried out at the eighth, 16th and 24th pixels in a manner similar to the fourth line. In the 16th line, the sampling is carried out at the 12th, 20th and 28th pixels in a manner similar to the eighth line.

Figure 20C:
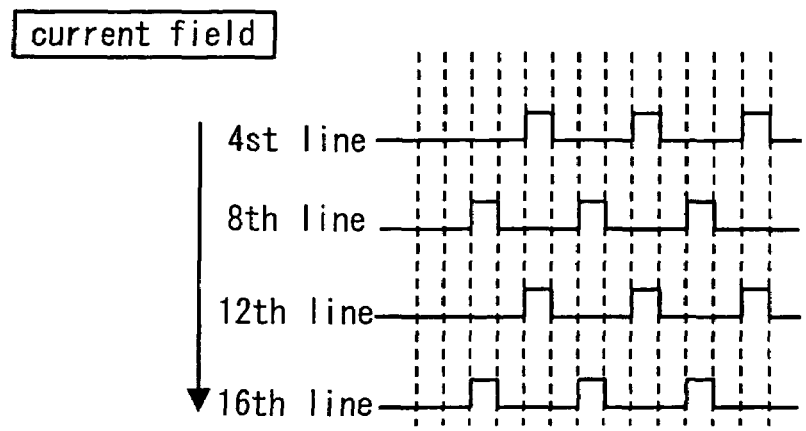
FIG. 20C is a third drawing showing the state of the sample window signal according to the preferred embodiment 7.
Figure 20D:
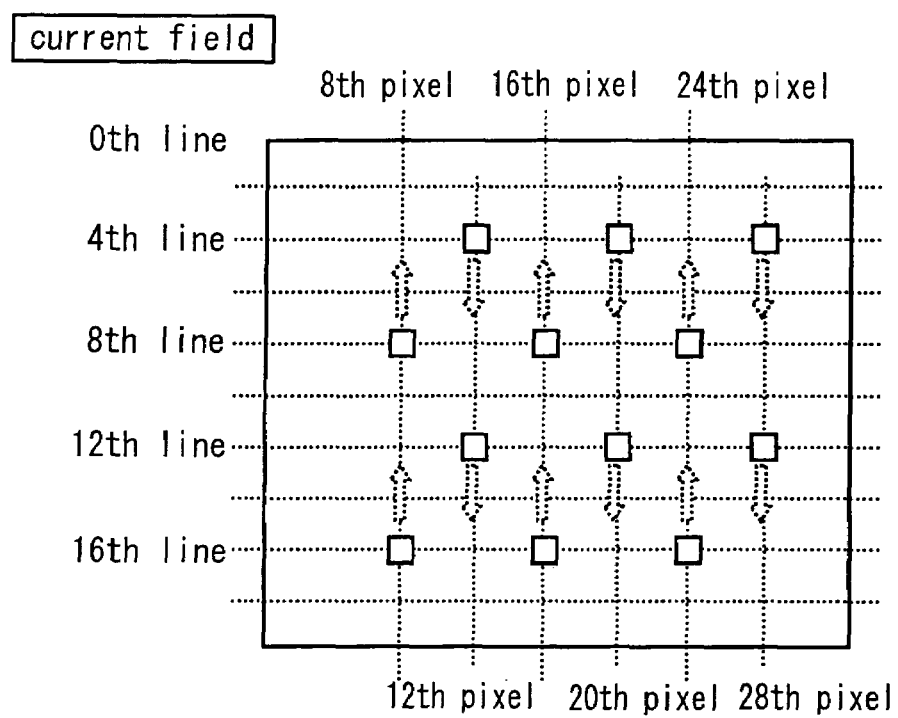
FIG. 20D is a fourth drawing showing the state of the sample window signal according to the preferred embodiment 7.

FIG. 20C shows the state of the sample window signal S9 shown in FIG. 20A per one skipping horizontal cycle in one field after the current field. In relation to FIG. 20A, the fourth line and the eighth line are replaced with one another, and the 12th line and the 16th line are replaced with one another. More specifically, in the fourth line, the sampling is carried out at the 12th, 20th and 28th pixels. In the eighth line, the sampling is carried out at the eighth, 16th and 24th pixels. In the 12th line, the sampling is carried out at the 12th, 20th and 28th pixels in a manner similar to the fourth line. In the 16th line, the sampling is carried out at the eighth, 16th and 24th pixels in a manner similar to the eighth line.

According to the present preferred embodiment, the sampling positions can be arbitrarily and equally designated in the vertical, horizontal and oblique directions on the screen. Further, the sampling pixel positions are shifted per field in the vertical direction, which further improves the arbitrariness and equality in the sampling position setting.

Preferred Embodiment 8

FIG. 21 is a block diagram illustrating a constitution according to a preferred embodiment 8 of the present invention in the sample window circuit 2 shown in FIG. 1. The constitution shown FIG. 21 is different from that of the preferred embodiment 3 (FIG. 9) in the point that some of circuit configurations are additionally provided. The added circuit configurations are described below.

47 denotes a field switching signal generating circuit for generating a field switching signal S53. The vertical differential signal S4 is inputted to the field switching signal generating circuit 47. The field switching signal generating circuit 47 generates the field switching signal S53 based on the vertical differential signal S4. The field switching signal S53 is a signal which repeats the inversion of 0, 1, 0, 1, . . . per N vertical cycles (N is a natural number equal to or more than 1).

The field switching signal generating circuit 47 can switch the sampling pixel positions in the horizontal direction based on a unit of a plurality of fields and lines. The field switching signal generating circuit 47 outputs the field switching signal S53 to the second selecting circuit 28. Because the rest of the constitution is the same as that of the preferred embodiment 3 (FIG. 9), the constitution and the operations are not described again.

FIG. 22 shows the field switching signal generating circuit 47. The field switching signal generating circuit (counter circuit) 47 shown here counts up the field per two fields. The field switching signal generating circuit (counter circuit) 47 counts up the field per N fields when the bit number of the field switching signal generating circuit (counter circuit) 47 is set to N (N is a natural number equal to or more than 1). Therefore, the vertical differential signal S4 is counted up one by one per two fields in the case of the field switching signal S53 in the present preferred embodiment.

Figure 23A:
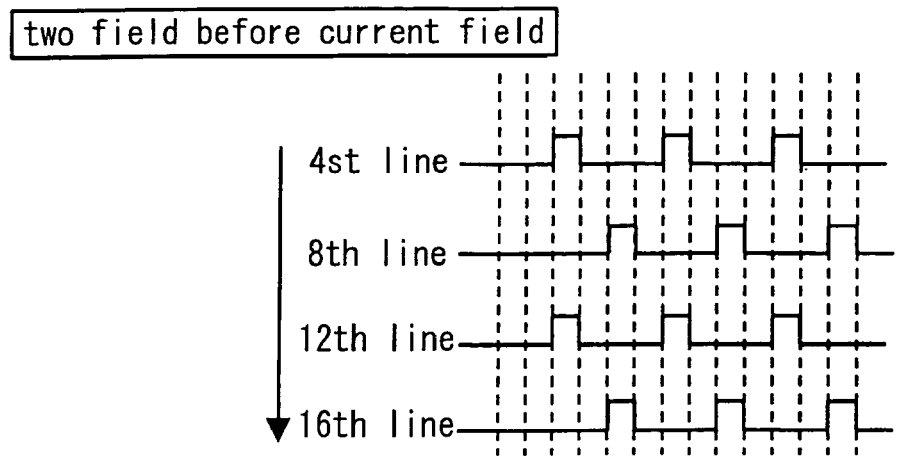
FIG. 23A is a first drawing showing a state of a sample window signal according to the preferred embodiment 8.
Figure 23B:
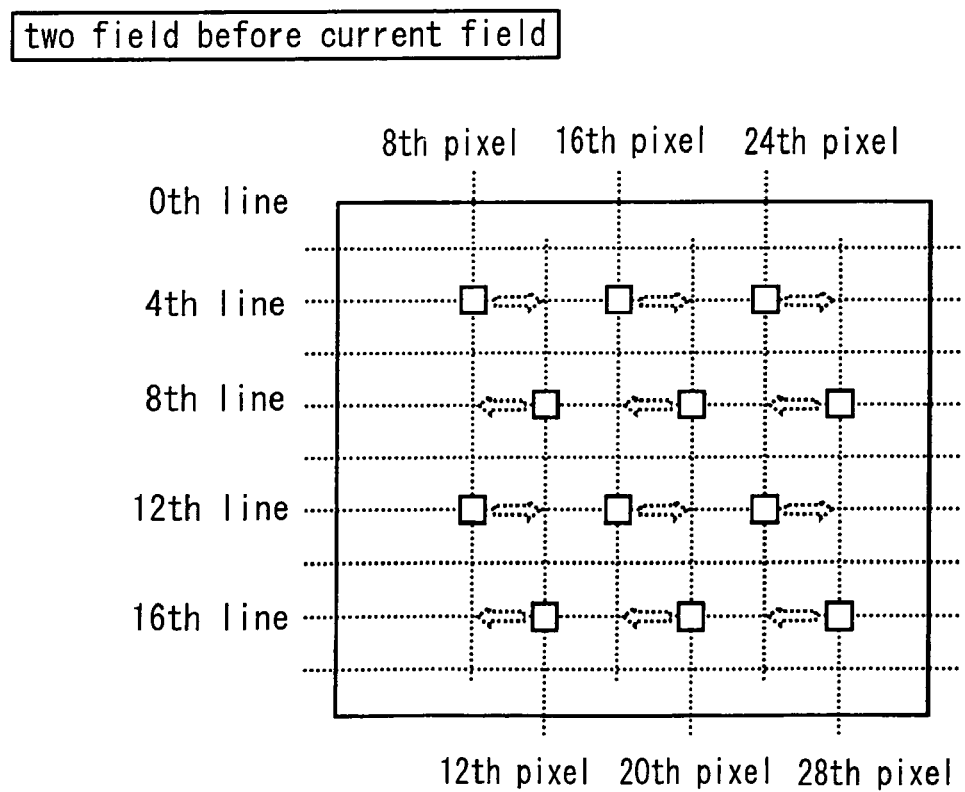
FIG. 23B is a second drawing showing the state of the sample window signal according to the preferred embodiment 8.

FIGS. 23A-23D show states of the sample window signal S9 according to the present preferred embodiment. In FIG. 23A, the state of the sample window signal S9 per one pixel skipping horizontal cycle in two fields before a current field is shown. FIG. 23B shows sampling positions on the screen by the sample window signal S9 shown in FIG. 23A. In the fourth line, the sampling is carried out at the eighth, 16th and 24th pixels. In the eighth line, the sampling is carried out at the 12th, 20th and 28th pixels. In the 12th line, the sampling is carried out at the eighth, 16th and 24th pixels in a manner similar to the fourth line. In the 16th line, the sampling is carried out at the 12th, 20th and 28th pixels in a manner similar to the eighth line.

Figure 23C:
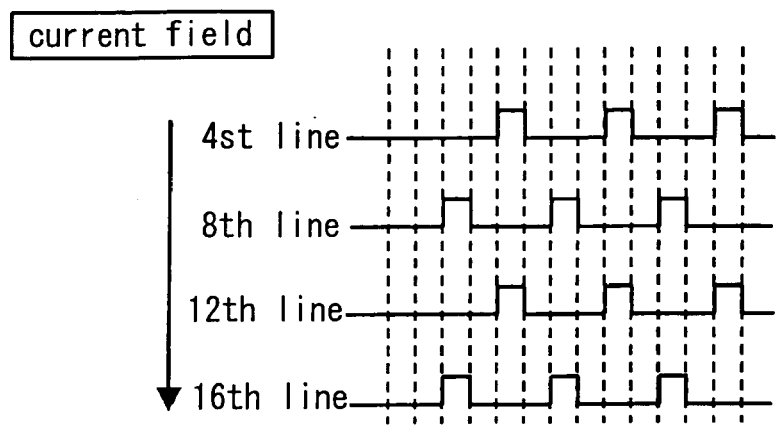
FIG. 23C is a third drawing showing the state of the sample window signal according to the preferred embodiment 8.
Figure 23D:
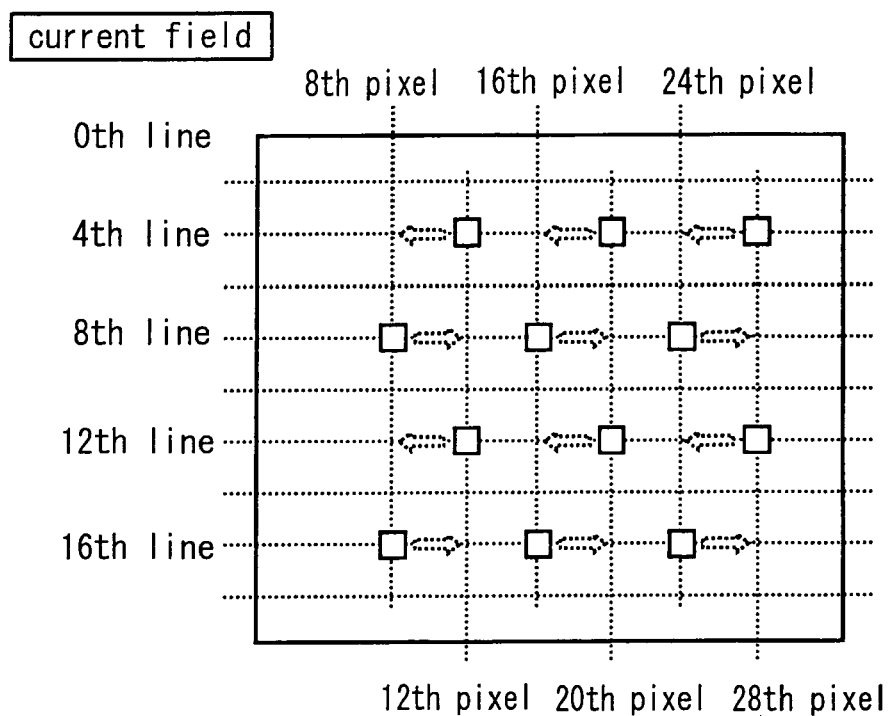
FIG. 23D is a fourth drawing showing the state of the sample window signal according to the preferred embodiment 8.
Figure 24:
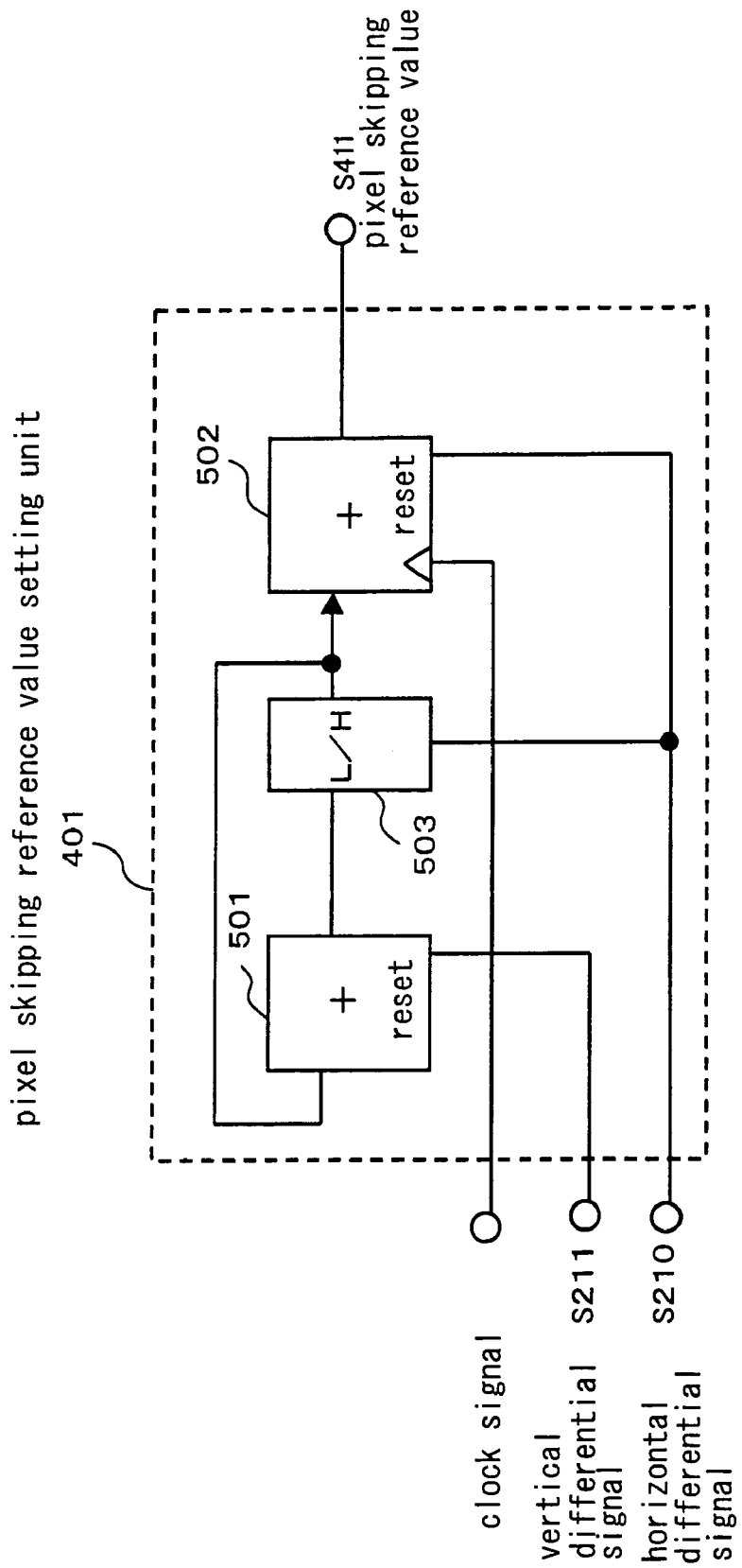
FIG. 24 is a block diagram illustrating a constitution of a conventional brightness signal processing apparatus.

FIG. 23C shows the state of the sample window signal S9 shown in FIG. 23A per one pixel skipping horizontal cycle in two fields after the current field. In response to FIG. 23A, the eighth pixel and the 12th pixel are replaced with one another, the 16th pixel and the 20th pixel are replaced with one another, and the 24th and the 28th pixel are replaced with one another. More specifically, in the fourth line, the sampling is carried out at the 12th, 20th and 28th pixels. In the eighth line, the sampling is carried out at the eighth, 16th and 24th pixels. In the 12th line, the sampling is carried out at the 12th, 20th and 28th pixels in a manner similar to the fourth line. In the 16th line, the sampling is carried out at the eighth, 16th and 24th pixels in a manner similar to the eighth line.

According to the present preferred embodiment, the sampling positions can be arbitrarily and equally designated in the vertical, horizontal and oblique directions on the screen. Further, the sampling pixel positions are shifted per the plurality of fields in the horizontal direction, which further improves the arbitrariness and equality in the sampling position setting.

INDUSTRIAL APPLICABILITY

As thus far described, the brightness signal processing apparatus according to the present invention can accurately sample the brightness signal of the video signal without enlarging the circuits, and is effectively utilized as an apparatus for improving an image quality of the video signal.

What is claimed is:

1. A brightness signal processing apparatus comprising:
   a differential operation circuit for outputting a horizontal differential signal synchronizing with a horizontal synchronous signal of an inputted video signal and a vertical differential signal synchronizing with a vertical synchronous signal of the inputted video signal by detecting and differentiating rise edges or breaking edges in the vertical synchronous signal and the horizontal synchronous signal;
   a first counter circuit for counting number of pixels in one horizontal period by resetting with the horizontal differential signal;
   a first AND circuit for executing an AND processing between the horizontal differential signal and an output signal of the first counter circuit;
   a first delay circuit for delaying an output signal of the first AND circuit per clock;
   a horizontal pixel skipping adjusting circuit for skipping pixels from an output signal of the first delay circuit while adjusting number of the pixels to be skipped in the one horizontal period;
   a first set/reset circuit for setting a first sampling effective period in the horizontal period which is set at a point at which an output result of the horizontal pixel skipping adjusting circuit and the horizontal period starting-point signal are coincident with each other and reset at a point at which the output result of the horizontal pixel skipping adjusting circuit and the horizontal period ending-point signal are coincident with each other by receiving a supply of a horizontal period starting-point signal which sets a starting point of a horizontal period of a sample window period and a horizontal period ending-point signals which sets an ending point thereof;
   a second AND circuit for detecting a point at which the first sampling effective period and the output result of the horizontal pixel skipping adjusting circuit are coincident with each other;
   a second delay circuit for delaying an output signal of the second AND circuit by N number of pixels (N is a natural number of at least 1);
   a first sampling pixel position switching signal generating circuit for generating a sampling pixel position switching signal which repeats inversion in each horizontal cycle from the horizontal differential signal; and output
   a first selecting circuit for selecting one from the signal of the second AND circuit and an output signal of the second delay circuit and outputting the selected signal as a sample window signal based on the sampling pixel position switching signal.

2. The brightness signal processing apparatus according to claim 1, wherein the first sampling pixel position switching signal generating circuit comprises:
   a delay circuit to which the horizontal differential signal is supplied as a clock; and
   an adding circuit for counting up an output of the delay circuit.

3. The brightness signal processing apparatus according to claim 1, further comprising:
   a second counter circuit for counting all of lines in one vertical period;
   a third AND circuit for executing an AND processing between the vertical differential signal and an output signal of the second counter circuit;
   a load hold circuit for load-holding an output signal of the third AND circuit based on the horizontal differential signal;
   a vertical pixel skipping adjusting circuit for skipping lines from all of the lines in the one vertical period while adjusting number of the lines to be skipped based on an output signal of the load hold circuit;
   a third comparing circuit for comparing a signal obtained by bit-shifting an output signal of the vertical pixel skipping adjusting circuit and the vertical period starting-point signal;

a fourth comparing circuit for comparing the signal obtained by bit-shifting the output signal of the vertical pixel skipping adjusting circuit and the vertical period ending-point signal;

a second set/reset circuit for generating a second sampling effective period signal based on the results of the comparison by the third comparing circuit and the fourth comparing circuit;

a fourth AND circuit for executing an AND processing between the second sampling effective period signal and the output signal of the vertical pixel skipping adjusting circuit;

a sampling pixel position switching signal generating circuit for generating a sampling pixel position switching signal which repeats inversion per a predetermined number of skipping lines from an output signal of the fourth AND circuit; and a fifth AND circuit for generating a sample window signal by executing the AND processing between an output signal of the first selecting circuit and an output signal of the fourth AND circuit.

4. The brightness signal processing apparatus according to claim 3, further comprising:

an inversion circuit for generating an inversion sampling pixel position switching signal by inverting the sampling pixel position switching signal;

a field switching signal generating circuit for generating a field switching signal which repeats inversion in each vertical cycle from the vertical differential signal; and a second selecting circuit for selecting one from the sampling pixel position switching signal and the inversion sampling pixel position switching signal based on the field switching signal, wherein the first selecting circuit is controlled based on the sampling pixel position switching signal from the second selecting circuit in place of the sampling pixel position switching signal from the sampling pixel position switching signal generating circuit.

5. The brightness signal processing apparatus according to claim 4, wherein the field switching signal generating circuit comprises:

a delay circuit to which the horizontal differential signal is supplied as a clock; and an adding circuit for counting up an output of the delay circuit.

6. The brightness signal processing apparatus according to claim 4, wherein the sampling pixel position switching signal generating circuit generates the sampling pixel position switching signal based on the output signal of the vertical pixel skipping adjusting circuit in place of the output signal of the fourth AND circuit, and the brightness signal processing apparatus further comprising:

a sampling line position switching signal generating circuit for generating a sampling line position switching signal which changes a sampling line position based on the output signal of the horizontal pixel skipping adjusting circuit used as a reset signal;

an inversion circuit for inverting the sampling line position switching signal;

a field switching signal generating circuit for generating a field switching signal which changes the sampling line position based on the output signal of the vertical pixel skipping adjusting circuit used as a reset signal;

a third selecting circuit for selecting one from the sampling line switching signal and an output signal of the inversion circuit based on the field switching signal;

a line memory for switching the sampling pixel position per line in the vertical direction by delaying the output signal of the vertical pixel skipping adjusting circuit; and a fourth selecting circuit for selecting one from the output signal of the vertical pixel skipping adjusting circuit and an output signal of the line memory circuit based on an output signal of the third selecting circuit.

7. The brightness signal processing apparatus according to claim 4, wherein the field switching signal generating circuit generates a field switching signal which switches the second selecting circuit per a plurality of fields based on the vertical differential signal used as a reset signal, and the sampling line position is switched per the plurality of fields based on the field switching signal.

8. The brightness signal processing apparatus according to claim 3, comprising:

a plurality of horizontal pixel skipping adjusting circuits respectively having different pixel skipping intervals in place of the horizontal pixel skipping adjusting circuit; and a selecting circuit for selecting one from output signals of the plurality of horizontal pixel skipping adjusting circuits based on the sampling pixel position switching signal and outputting the selected output signal to the second AND circuit in place of the output signal of the second delay circuit and the output signal of the first selecting circuit.

9. The brightness signal processing apparatus according to claim 3, wherein the sampling pixel position switching signal generating circuit generates a field switching signal which controls the first selecting circuit in each vertical period from the vertical differential signal in place of generating the sampling pixel position switching signal from the output signal of the fourth AND circuit.

10. The brightness signal processing apparatus according to claim 3, comprising:

a plurality of vertical pixel skipping adjusting circuits respectively having different pixel skipping intervals in place of the vertical pixel skipping adjusting circuit;

a field switching signal generating circuit for generating a field switching signal which repeats inversion in each vertical cycle from the vertical differential signal in place of the second delay circuit, the first selecting circuit and the sampling pixel position switching signal generating circuit; and a selecting circuit for selecting one from output signals of the plurality of vertical pixel skipping adjusting circuit based on the field switching signal and outputting the selected output signal to the fourth AND circuit.

* * * * *